(12) United States Patent
Settsu

(10) Patent No.: US 8,583,960 B2
(45) Date of Patent: Nov. 12, 2013

(54) PROCESSOR DEVICE AND PROGRAM

(75) Inventor: Atsushi Settsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/808,754

(22) PCT Filed: Jul. 6, 2010

(86) PCT No.: PCT/JP2010/061436
§ 371 (c)(1),
(2), (4) Date: Jan. 7, 2013

(87) PCT Pub. No.: WO2012/004854
PCT Pub. Date: Jan. 12, 2012

(65) Prior Publication Data
US 2013/0111264 A1    May 2, 2013

(51) Int. Cl.
*G06F 11/00* (2006.01)
(52) U.S. Cl.
USPC .......................................................... 714/11
(58) Field of Classification Search
USPC .......................................................... 714/11
See application file for complete search history.

(56) References Cited

U.S. PATENT DOCUMENTS 7,308,609 B2 * 12/2007 Dickenson et al. ............. 714/36
7,788,537 B1 *  8/2010 Yellen et al. ................. 714/38.11
8,151,143 B2 *  4/2012 Li et al. ....................... 714/38.11
8,375,386 B2 *  2/2013 Hendel .............................. 718/1

FOREIGN PATENT DOCUMENTS

| | | |
|---|---|---|
| JP | 59 148492 | 8/1984 |
| JP | 61 260338 | 11/1986 |
| JP | 63 200242 | 8/1988 |
| JP | 64 76230 | 3/1989 |
| JP | 2 257358 | 10/1990 |
| JP | 3 216742 | 9/1991 |
| JP | 6 342387 | 12/1994 |
| JP | 7 234808 | 9/1995 |
| JP | 8 30565 | 2/1996 |
| JP | 9 330253 | 12/1997 |
| JP | 2000 148544 | 5/2000 |
| JP | 2006 40001 | 2/2006 |
| JP | 2006 172100 | 6/2006 |
| JP | 2007 334403 | 12/2007 |
| WO | 2007 077604 | 7/2007 |

OTHER PUBLICATIONS

International Search Report Issued Oct. 12, 2010 in PCT/JP10/61436 Filed Jul. 6, 2010.

\* cited by examiner

*Primary Examiner* — Bryce Bonzo
(74) *Attorney, Agent, or Firm* — Oblon, Spivak, McClelland, Maier & Neustadt, L.L.P.

(57) ABSTRACT

When an error occurs while a memory dump performing unit of a processor core is storing in an HDD device data of a memory device which is a shared memory, a memory dump error detection unit detects a memory dump error. A core coordination unit notifies the memory dump error to a core coordination unit of a processor core. Upon being notified by the core coordination unit of the memory dump error in the memory dump performing unit, a memory dump performing unit of the processor core stores in the HDD device the data of the memory device in place of the memory dump performing unit.

16 Claims, 29 Drawing Sheets

PROCESSOR DEVICE AND PROGRAM

TECHNICAL FIELD

The present invention relates to a memory dump technology by which a processor device stores data of a memory device in a secondary storage device.

BACKGROUND ART

In a computer system, there exists a commonly used technique in which, upon occurrence of a failure, contents of a memory device (hereinafter also described simply as a memory) are stored in a secondary storage device (this is called a memory dump) and are used to analyze a cause of the failure.

In a conventional memory dump method, it is common that a failing processor device (a processor device will also be described simply as a processor) itself performs storage into a secondary storage device. In this case, when the storage into the secondary storage device cannot be performed in the failing processor, a memory dump cannot be performed.

As a method to solve this, for example, there is a method discussed in Patent Document 1.

In the method of Patent Document 1, when a failing processor can access a secondary storage device, the failing processor loads a failure processing program into a common memory and stores contents of a unique memory of the failing processor in the secondary storage device by using the failure processing program loaded into the common memory.

On the other hand, when the failing processor cannot access the secondary storage device, a specific processor is selected as a support processor from among healthy processors.

Then, the support processor loads the failure processing program into the common memory, and the failing processor copies the contents of its unique memory to the common memory by using the failure processing program loaded into the common memory.

Then, the support processor stores in the secondary storage device the contents of the unique memory of the failing processor copied to the common memory.

CITATION LIST

Patent Documents

Patent Document 1: JP 8-30565 A

DISCLOSURE OF INVENTION

Technical Problem

In the conventional technology described above, whether or not the failing processor is capable of storing the contents of its unique memory in the secondary storage device is determined based on configuration information preconfigured in processor device information.

When the failing processor is configured to be capable of storing the contents of the unique memory in the secondary storage device, if an error occurs in the failure processing program while the failing processor is storing the contents of the unique memory in the secondary storage device by using the failure processing program, the contents of the unique memory cannot be stored in the secondary storage device.

An error may occur in the failure processing program when the failure processing program is stored in the common memory and then program code becomes corrupted due to a write from different code (i.e., an error may occur due to a so-called bug of the program).

Further, an error may occur in the failure processing program when the processor includes an MMU (Memory Management Unit) that translates a logical address space into a physical address space and the failure processing program operates using the logical address space, and then setting of the logical address space becomes corrupted due to a write from different code to a translation table for accessing the logical address space corresponding to an area where failure information (the contents of the unique memory of the failing processor) is stored.

In such a case, even if the failing processor is configured to be capable of storing the contents of the unique memory in the secondary storage device, the contents of the unique memory cannot be stored in the secondary storage device because an error occurs while the contents are being stored.

When the support processor stores the contents of the unique memory of the failing processor in the secondary storage device, if an error occurs while the failing processor is storing the contents of the unique memory in the common memory, the contents cannot be stored.

Further, when the support processor stores the contents of the unique memory of the failing processor from the common memory into the secondary storage device, if an event such as described above occurs against a storage processing program or the logical address space of the common memory, the contents cannot be stored in the secondary storage device.

It is a primary object of this invention to solve the above-described problems. This invention primarily aims to obtain, in a configuration where a plurality of processor devices share a memory device, a mechanism by which a memory dump can be performed reliably by another processor device even if a processor device performing the memory dump becomes unable to perform the memory dump properly.

Solution to Problem

A processor device according to the present invention is connected with another processor device, the another processor device performing a memory dump of a memory device that is shared between the processor device and the another processor device, and the processor device includes:

a failure detection unit that detects that the memory dump is not being performed properly in the another processor device; and a memory dump performing unit that, when the failure detection unit detects that the memory dump is not being performed properly in the another processor device, performs the memory dump of the memory device in place of the another processor device.

Advantageous Effects of Invention

According to the present invention, when a failure detection unit detects that a memory dump is not being performed properly in another processor core, a memory dump performing unit performs the memory dump of a memory device in place of the another processor core. Thus, a memory dump can be performed reliably even if a processor device performing the memory dump becomes unable to perform the memory dump properly.

DESCRIPTION OF PREFERRED EMBODIMENTS

First Embodiment

In this embodiment, description will be directed to a memory dump method in a hardware configuration in which a plurality of processor cores share a memory.

More specifically, this embodiment relates to the memory dump method in a configuration in which a plurality of operating systems and applications are operating on each processor core, wherein a failure occurs in one of the processor cores, and then an error occurs in this processor core while an OS operating on this processor core is storing contents of the memory in a secondary storage device.

In this embodiment, the memory dump method will be described by which a memory dump can be performed reliably even if a failure occurs in a memory dump process, by arranging that an error is detected in a processor core performing a memory dump, the processor core that has detected the error instructs another processor core to perform the memory dump, and the another processor core stores the contents of the memory in the secondary storage device.

The memory dump method according to a first embodiment will now be described with reference to drawings.

Figure 1:
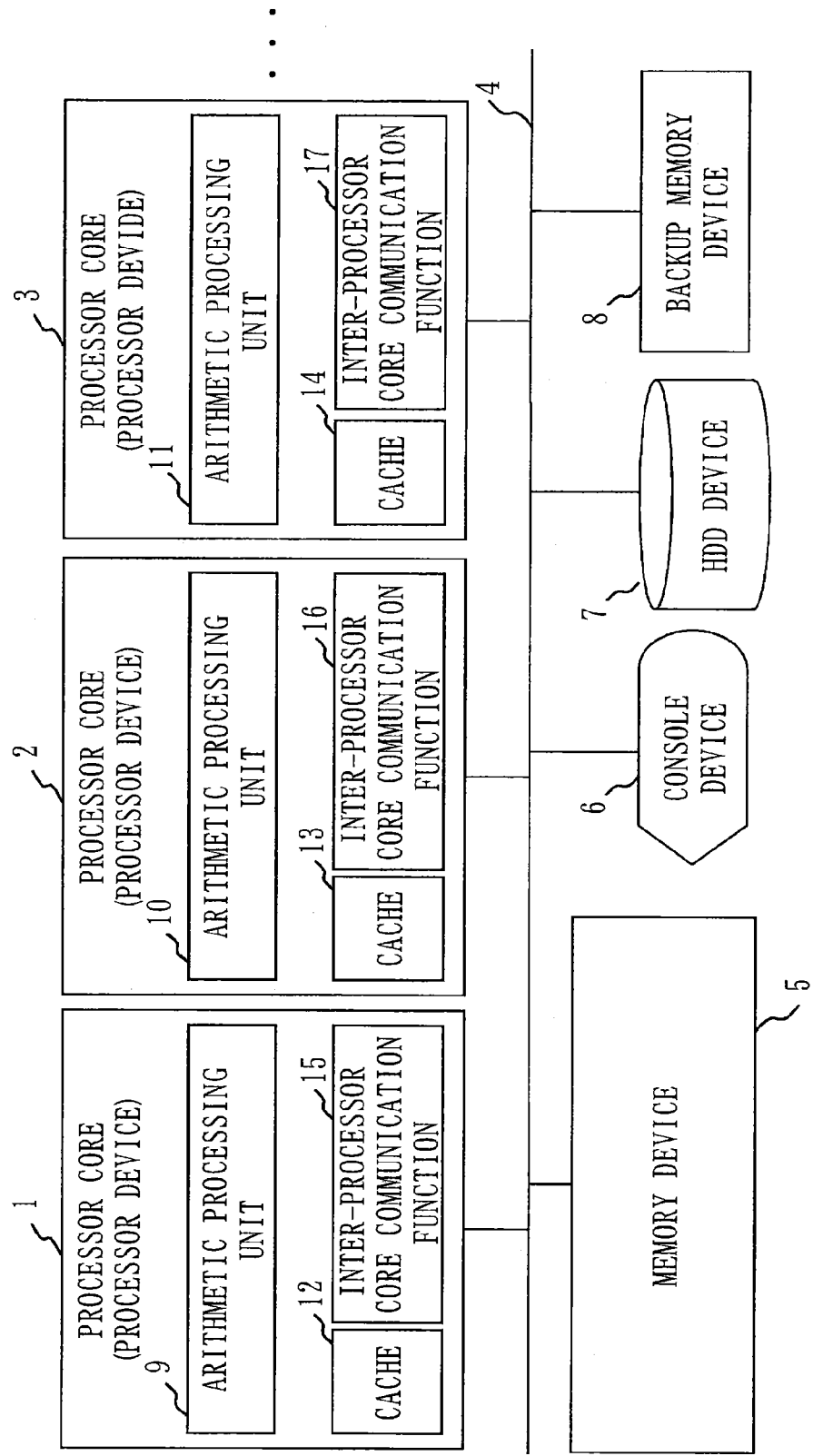
FIG. 1 is a diagram showing an example hardware configuration according to a first embodiment.

FIG. 1 shows an example hardware configuration in the memory dump method according to this embodiment.

In FIG. 1, reference numerals 1, 2, and 3 indicate processor cores that perform arithmetic processing. These processor cores are coupled with one another by a bus 4.

Each processor core is an example of a processor device.

By way of the bus 4, the processor core 1, the processor core 2, and the processor core 3 are coupled with a memory device 5, a console device 6, a hard disk device (hereinafter also described as an HDD device) 7, and a backup memory device 8.

The memory device 5 holds code and data of an operating system (hereinafter also described as an OS), code and data of an application (hereinafter also described as an AP), and heaps/stacks.

As described above, the processor core 1, the processor core 2, and the processor core 3 share the memory device 5.

The console device 6 outputs a message from an OS or AP.

The hard disk device 7 stores contents of the memory device 5 during a memory dump.

The backup memory device 8 holds information on a file for storing the contents of the memory device 5, the file residing on the HDD device 7.

In the processor core 1, the processor core 2, and the processor core 3 respectively, there exist arithmetic processing units 9 (the processor core 1), 10 (the processor core 2), and 11 (the processor core 3). There also exist caches 12 (the processor core 1), 13 (the processor core 2), and 14 (the processor core 3) for temporarily holding the contents of the memory device 5 and processing results of each arithmetic processing unit. There also exist inter-processor core communication functions 15 (the processor core 1), 16 (the processor core 2), and 17 (the processor core 3) for communications among the processor cores.

Methods used as the inter-processor core communication function include a method in which an interrupt notification is sent to a processor core, a method using the memory device 5 in which a processor core desiring communication places a mark in a memory area to be referenced by a communication target processor core and the communication target processor core becomes aware of a notification by referencing the mark, and so on.

In this embodiment, three processor cores are shown. However, the number of processor cores does not have to be three. Operations remain unchanged with two processor cores or four or more processor cores.

Figure 2:
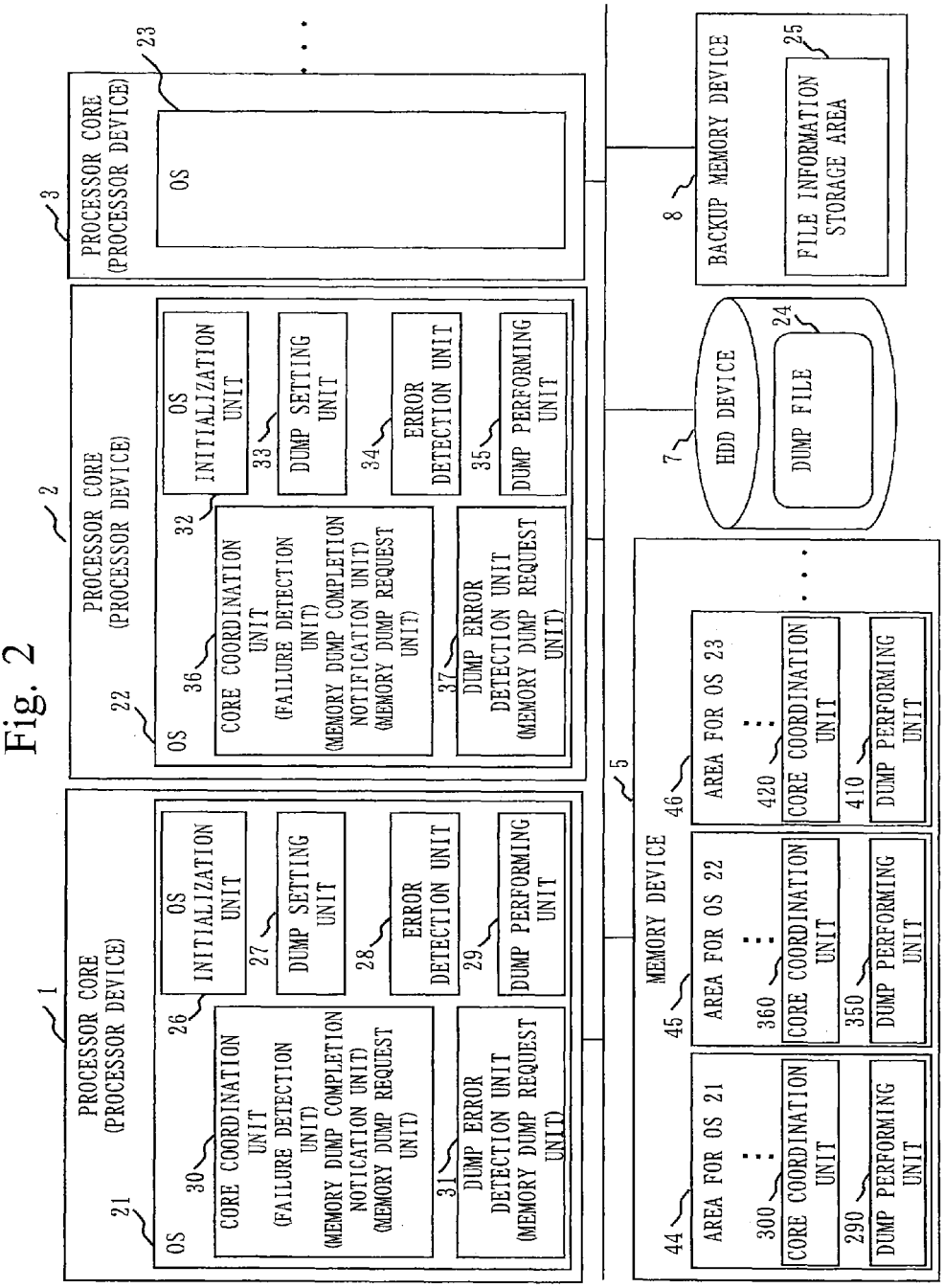
FIG. 2 is diagram showing an example software configuration according to the first embodiment.

FIG. 2 is a diagram showing an example software configuration corresponding to the hardware configuration shown in FIG. 1.

In FIG. 2, an operating system (OS) 21 operates on the processor core 1.

Likewise, an OS 22 operates on the processor core 2, and an OS 23 operates on the processor core 3.

In the HDD device 7, there exists a dump file 24 which is a storage area for storing the contents of the memory device 5. In the backup memory device 8, there exists a file information storage area 25 that stores position information of the dump file 24 within the HDD device 7, and so on.

In the OS 21 of the processor core 1, there exist an OS initialization unit 26 that operates upon reset of the processor core 1 to initialize the OS 21 itself, a memory dump setting unit 27 (also described as a dump setting unit 27) that sets in the file information storage area 25 information on the dump file 24, and an error detection unit 28 that detects an error that has forced the OS 21 to stop operating as a result of an invalid instruction execution or an invalid address access.

In the OS 21, there also exists a memory dump performing unit 29 (also described as a dump performing unit 29) that writes the contents of the memory device to the dump file 24 upon instruction from the error detection unit 28 and based on the information on the dump file in the file information storage area 25.

As will be described later, when it is detected that a memory dump is not being performed properly in a different processor core (e.g., the processor core 2), the memory dump performing unit 29 performs the memory dump of the memory device 5 in place of the different processor core.

Further, in the OS 21, there exist a core coordination unit 30 for communications among the processor cores and a memory dump error detection unit 31 (also described as a dump error detection unit 31) that detects an error occurring in a process of the memory dump performing unit 29.

In the OS 22 of the processor core 2, as counterpart means, there exist an OS initialization unit 32, a memory dump setting unit 33 (also described as a dump setting unit 33), an error detection unit 34, a memory dump performing unit 35 (also described as a dump performing unit 35), a core coordination unit 36, and a memory dump error detection unit 37 (also described as a dump error detection unit 37).

Although not shown in FIG. 2, in the OS 23 of the processor core 3, as counterpart means, there exist an OS initialization unit, a memory dump setting unit, an error detection unit, a memory dump performing unit, a core coordination unit, and a memory dump error detection unit.

These elements in the OS 23 will be referred to as an OS initialization unit 38, a memory dump setting unit 39, an error detection unit 40, a memory dump performing unit 41, a core coordination unit 42, and a memory dump error detection unit 43.

The core coordination unit 30, the core coordination unit 36, and the core coordination unit 42 each correspond to an example of a failure detection unit, a memory dump completion notification unit, and a memory dump request unit.

The memory dump error detection unit 31, the memory dump error detection unit 37, and the memory dump error detection unit 43 correspond to an example of a memory dump request unit.

As will be described later, in an instance where the processor core 2 performs a memory dump, the memory dump error detection unit 37 monitors a state of the memory dump being performed by the memory dump performing unit 35.

When the memory dump error detection unit 37 detects that the memory dump is not being performed properly in the memory dump performing unit 35, the core coordination unit 36 requests, for example, the core coordination unit 30 of the processor core 1 to perform the memory dump of the memory device 5 in place of the memory dump performing unit 35.

The core coordination unit 30 receives from the core coordination unit 36 this memory dump request, that is, a notification that the memory dump is not being performed properly in the processor core 2, thereby detecting that the memory dump is not being performed properly in the processor core 2.

When the memory dump is completed properly in the memory dump performing unit 29 of the processor core 1, the core coordination unit 30 notifies the core coordination unit 36 that the memory dump has been completed properly.

Execution code and data of the OS 21, the OS 22, and the OS 23 operating on the processor core 1, the processor core 2, and the processor core 3 as well as applications (APs) operating on each OS reside in the memory device 5.

Accordingly, in the memory device 5, there exist an area 44 for the OS 21 used by the OS 21, an area for the OS 22 used by the OS 22, and an area for the OS 23 used by the OS 23.

If code and data of the respective OSs are overlapped, the OSs cannot operate. Thus, the areas for the respective OSs are located in the memory device 5 independently of one another (at different physical addresses).

Each element in each OS also exists in the area for each OS. Code and data of the memory dump performing unit 29, the core coordination unit 30, and so on of the OS 21 exist as a memory dump performing unit 290 (also described as a dump performing unit 290), a core coordination unit 300, and so on in the area 44 for the OS 21. Likewise, each element of the OS 22 and each element of the OS 23 exist in the area 45 for the OS 22 and the area 46 for the OS 23, respectively.

In the area 45 for the OS 22, code and data of the memory dump performing unit 35, the core coordination unit 36, and so on exist as a memory dump performing unit 350 (also described as a dump performing unit 350), a core coordination unit 360, and so on.

Further, in the area 46 for the OS 23, code and data of the memory dump performing unit 41, the core coordination unit 42, and so on exist as a memory dump performing unit 410 (also described as a dump performing unit 410), a core coordination unit 420, and so on.

Example operations of the memory dump method according to this embodiment upon occurrence of a failure will now be described with reference to arrows in FIGS. 3 and 4 and flowcharts of FIGS. 5 and 6.

Figure 3:
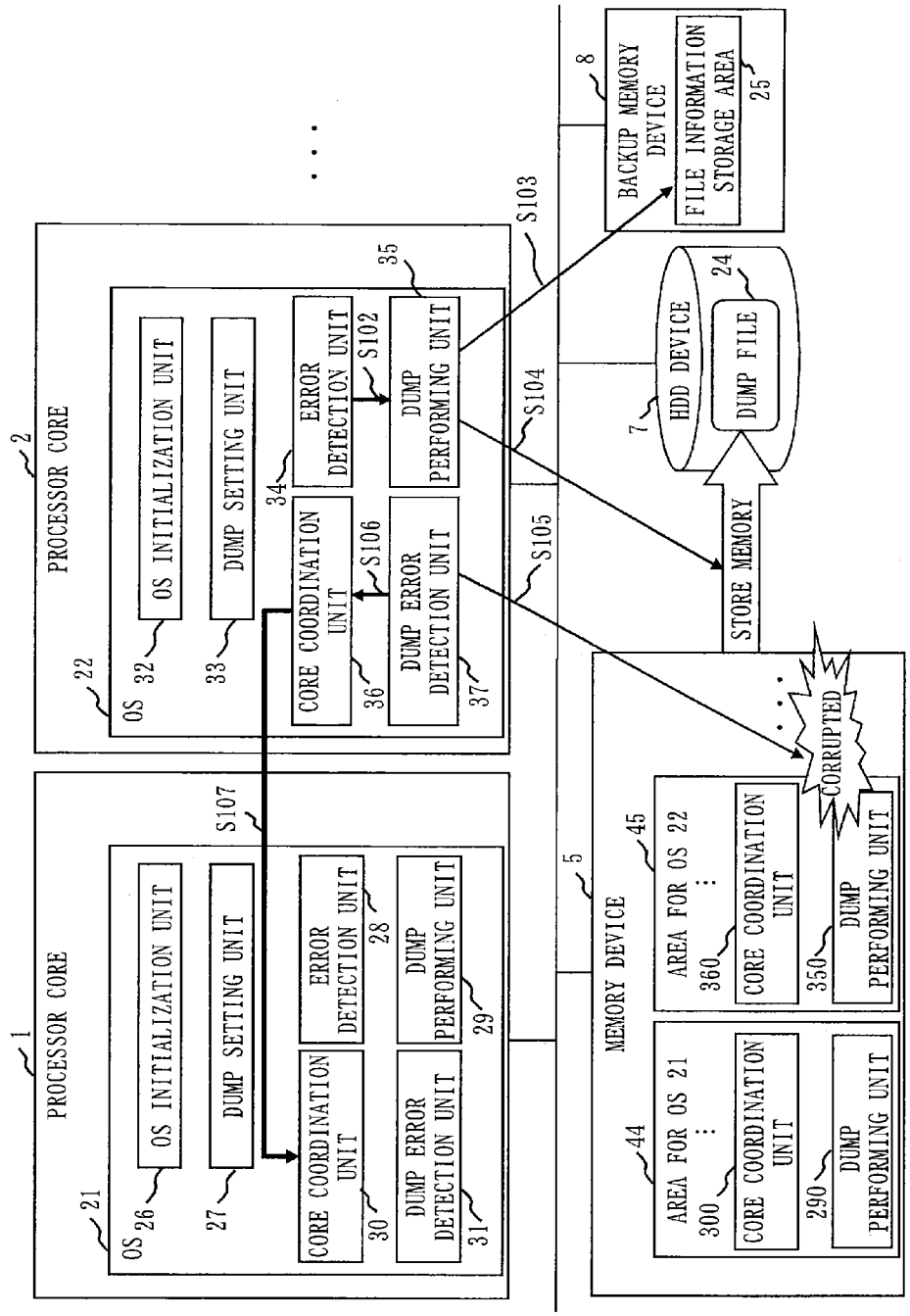
FIG. 3 is a diagram showing example operations upon occurrence of a failure according to the first embodiment.
Figure 4:
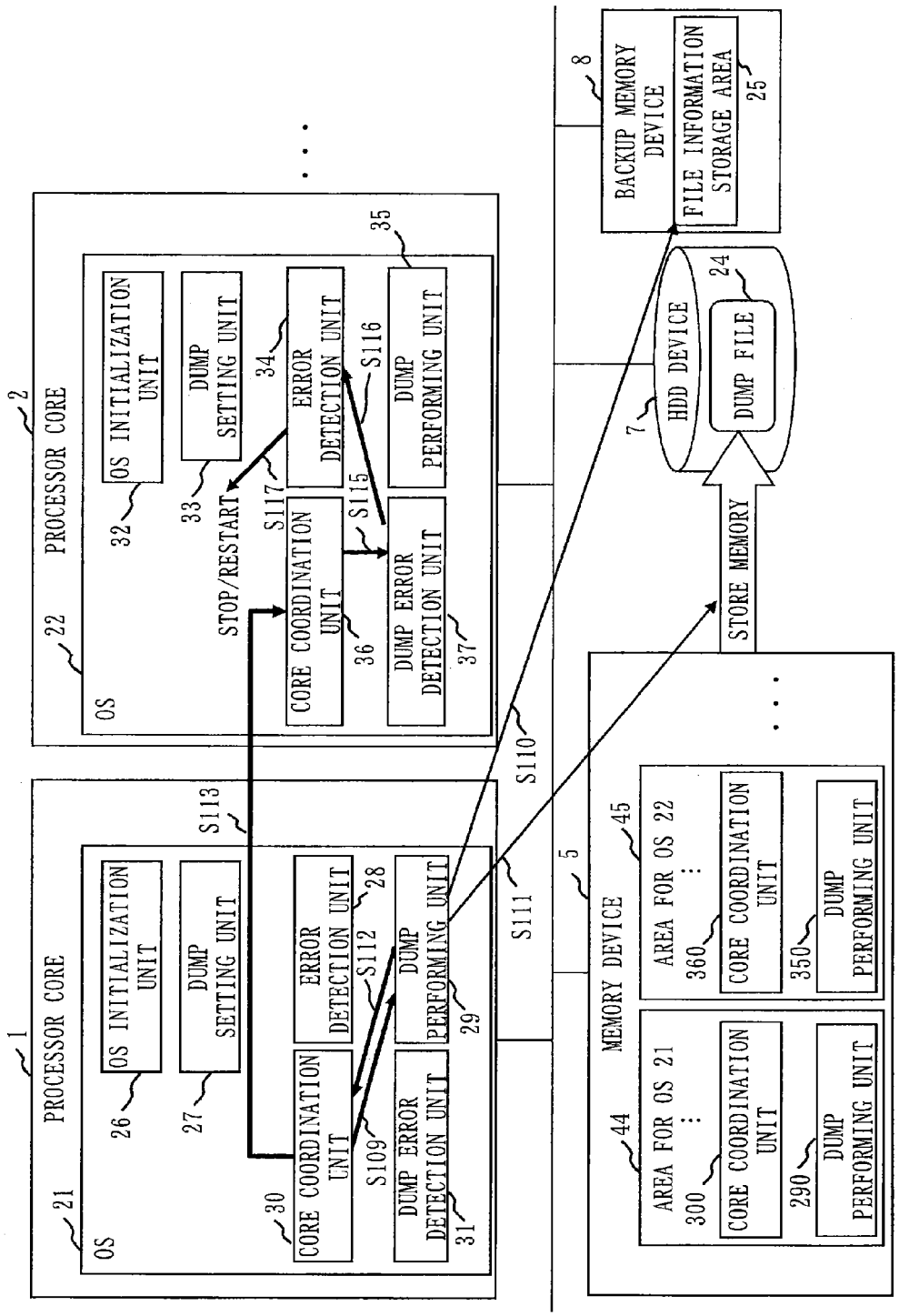
FIG. 4 is a diagram showing example operations upon occurrence of a failure according to the first embodiment.

In FIGS. 3 and 4, the processor core 3, the area 46 for the OS 23 in the memory device 5, and the console device 6 are omitted from being shown for convenience of illustration.

Referring to FIGS. 3 to 6, an example will be described in which a failure occurs in the OS 22 operating on the processor core 2, and data of the memory dump performing unit 350 in the area 45 for the OS 22, which is code data of the memory dump performing unit 35 of the OS 22 residing on the memory device 5, has been corrupted.

Figure 5:
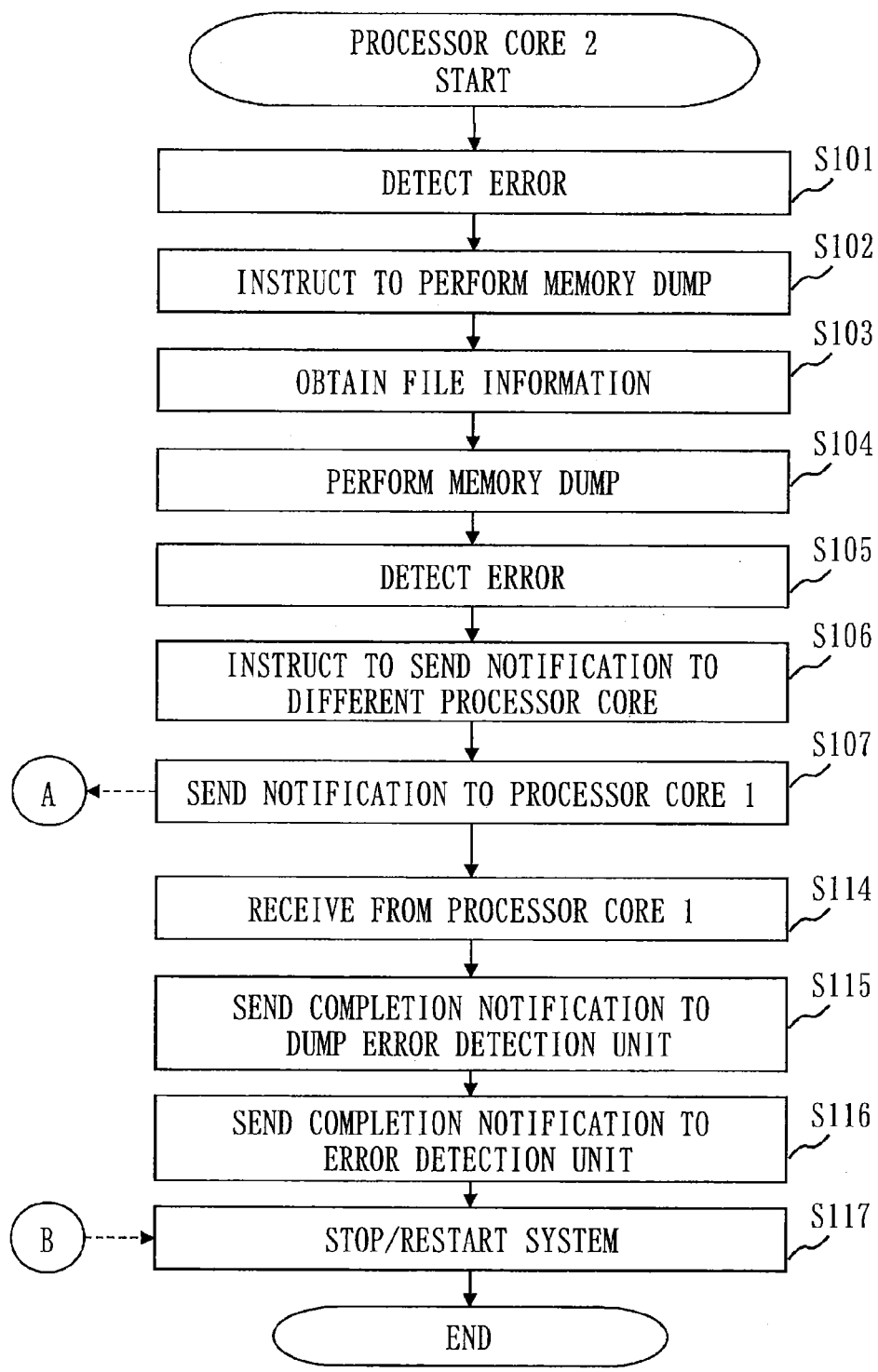
FIG. 5 is a flowchart diagram showing example operations upon occurrence of a failure according to the first embodiment.

First, when a failure occurs during operation of the OS 22, the error detection unit 34 of the OS 22 detects this error (S101 of FIG. 5).

In this error detection, an error may be detected solely by the OS 22 due to lack of resources, or an error may be detected as a result of occurrence of an exception on the processor core 2 due to an invalid address access or an invalid instruction execution.

When such an error is detected by the error detection unit 34, the error detection unit 34 performs a process to identify a cause of the error and so on, and then sends a memory dump instruction to the memory dump performing unit 35 (S102 of FIGS. 3 and 5).

Upon receiving the memory dump instruction, the memory dump performing unit 35 configures the processor core 2 such that an exception occurring in the processor core 2 in performing a memory dump will be detected by the memory dump error detection unit 37 to prevent the error detection unit 34 from detecting the exception again (since this detection will cause a memory dump instruction again). Then, the memory dump performing unit 35 obtains from the file information storage area 25 in the backup memory device 8 position information of the dump file 24 in the HDD device 7 (S103 of FIGS. 3 and 5).

Next, based on the obtained position information, the memory dump performing unit 35 writes the contents of the memory device 5 to the dump file 24 in the HDD device 7 (S104 of FIGS. 3 and 5).

If the data of the memory dump performing unit 350 in the area 45 for the OS 22 in the memory device 5 has not been corrupted, the operation of the memory dump performing unit 35 is not hindered, so that the memory dump performing unit 35 completes processing the memory dump properly.

However, if the data of the memory dump performing unit 350 in the area 45 for the OS 22 in the memory device 5 has been corrupted, the operation of the memory dump performing unit 35 becomes undefined, causing an exception on the processor core 2 due to an invalid instruction execution or an invalid access.

In this case, the operation of the memory dump performing unit 35 has already been corrupted. Thus, even if the memory dump performing unit 35 is activated again, the memory dump cannot be performed properly.

The memory dump error detection unit 37 monitors a state of the memory dump being performed by the memory dump performing unit 35, so that the memory dump error detection unit 37 detects that the exception has occurred on the processor core 2 (S105 of FIGS. 3 and 5).

Upon detecting the error, the memory dump error detection unit 37 instructs the core coordination unit 36 to send a notification (a notification including a memory dump request) to a different processor core (S106 of FIGS. 3 and 5).

Upon being instructed by the memory dump error detection unit 37, the core coordination unit 36 selects a processor core to send the notification to.

Here, the core coordination unit 36 sends the notification to the processor core 1 (S107 of FIGS. 3 and 5).

Methods of selecting a processor core include selecting a specific processor core that is predetermined, selecting a processor core with the lowest load based on load conditions of the respective processor cores recorded in the memory device 5, and so on.

The notification to a processor core may be effected by using an interrupt among processor cores, or by synchronization by writing to and reading from a common area in the memory device 5.

In this embodiment, using such methods, the core coordination unit 36 of the processor core 2 selects the processor core 1 and sends the notification to the processor core 1.

Figure 6:
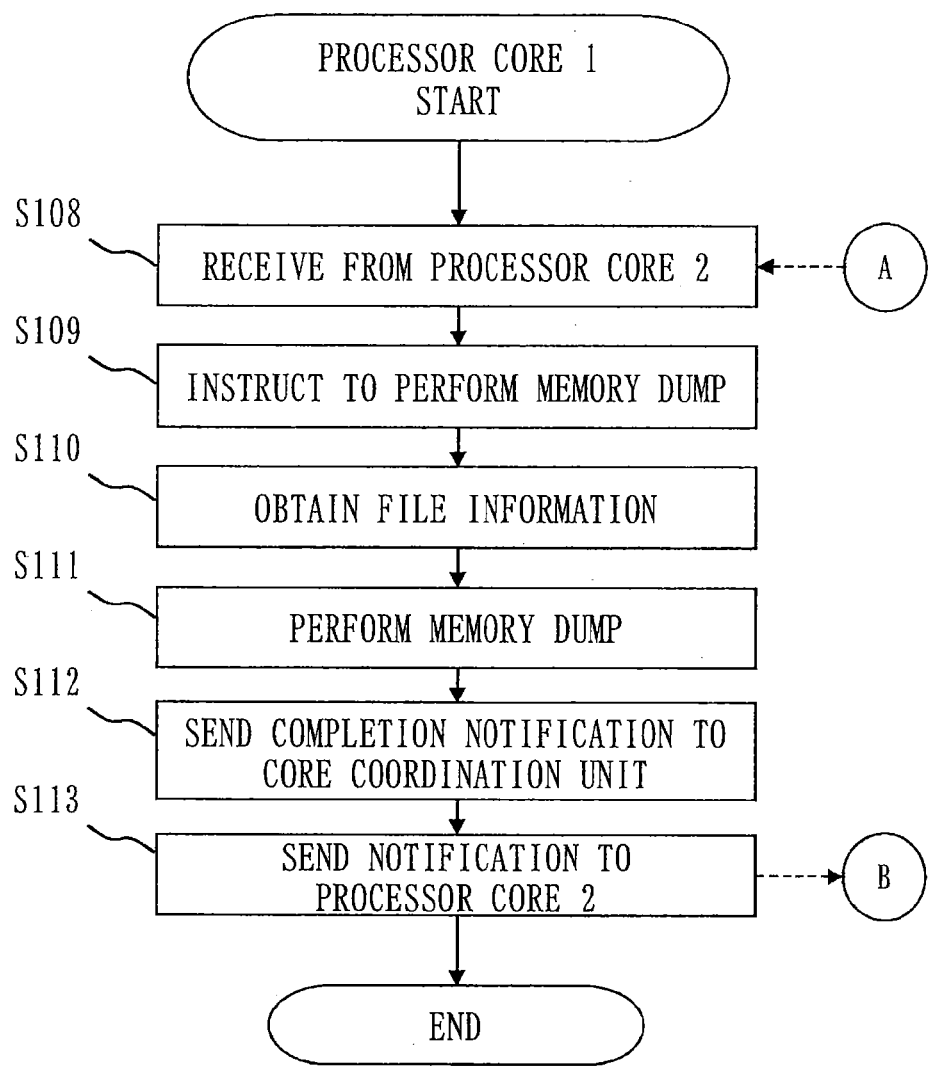
FIG. 6 is a flowchart diagram showing example operations upon occurrence of a failure according to the first embodiment.

This notification is received by the core coordination unit 30 of the processor core 1 (S108 of FIG. 6).

Upon receiving the notification from the core coordination unit 36 of the processor core 2, the core coordination unit 30 of the processor core 1 instructs the memory dump performing unit 29 to perform the memory dump (S109 of FIGS. 4 and 6).

The memory dump performing unit 29 obtains from the file information storage area 25 in the backup memory device 8 the position information of the dump file 24 in the HDD device 7 (S110 of FIGS. 4 and 6). Based on the obtained position information, the memory dump performing unit 29 writes the contents of the memory device 5 to the dump file 24 in the HDD device 7 (S111 of FIGS. 4 and 6).

Although the data of the memory dump performing unit 350 in the area 45 for the OS 22 in the memory device 5 has been corrupted, this does not hinder the operation of the memory dump performing unit 290 in the area 44 for the OS 21 in the memory device 5, so that the memory dump performing unit 29 completes the memory dump properly.

Upon completing the memory dump, the memory dump performing unit 29 sends a memory dump completion notification to the core coordination unit 30 (S112 of FIGS. 4 and 6).

The core coordination unit 30 sends a processing completion notification to the processor core 2 from which the initial notification originated (S113 of FIGS. 4 and 6).

This notification is received by the core coordination unit 36 of the processor core 2 (S114 of FIG. 5).

Upon receiving the notification from the core coordination unit 30 of the processor core 1, the core coordination unit 36 of the processor core 2 sends a processing completion notification to the memory dump error detection unit 37 (S115 of FIGS. 4 and 5).

Upon receiving this notification, the memory dump error detection unit 37 sends a processing completion notification to the error detection unit 34 (S116 of FIGS. 4 and 5).

Upon receiving the notification, because the contents of the memory have been stored, the error detection unit 34 stops or restarts the device (S117 of FIGS. 4 and 5).

The above has described the operations of the memory dump method according to this embodiment upon occurrence of a failure.

As described above, in the memory dump method according to the first embodiment, when a failure occurs in one of the processor cores, and then an error occurs in the memory dump performing unit while the contents of the memory are being stored in the secondary storage device by the OS operating on this processor core, the processor core sends a memory dump instruction to a different processor core, and a memory dump is performed on the different processor core.

Therefore, a memory dump can be performed reliably even if a failure occurs during a memory dump process.

As described with reference to the memory dump performing unit 35 of the processor core 2, in a process of the memory dump performing unit 29 of the processor core 1, the processor core 1 may be configured such that an exception of the processor core 1 will be detected by the memory dump error detection unit 31. Upon occurrence of an error during the process of the memory dump performing unit 29 of the processor core 1, a memory dump instruction may be sent to yet another different processor core (for example, the processor core 3).

With this arrangement, a memory dump can be performed with enhanced reliability.

In this embodiment, after the memory dump performing unit 29 of the processor core 1 completes processing the memory dump, the processing completion notification is sent to the error detection unit 34 of the processor core 2 via the core coordination unit 30, and the error detection unit 34 of the processor core 2 stops or restarts the device.

In this regard, substantially the same memory dump method may be obtained by arranging that the memory dump performing unit 29 sends the processing completion notification to the error detection unit 28 of the processor core 1, and the error detection unit 28 stops or restarts the device.

In this embodiment, with regard to the error in the process of the memory dump performing unit 35, the error is detected when the memory dump error detection unit 37 detects occurrence of the exception in the processor core 2.

In this regard, substantially the same memory dump method may be obtained by arranging that the error is notified to the memory dump error detection unit 37 when the memory dump performing unit 35 detects use of invalid data, in place of occurrence of the exception.

In this embodiment, with regard to the error in the process of the memory dump performing unit 35, the error is detected when the memory dump error detection unit 37 in the OS 22 detects occurrence of the exception in the processor core 2.

In this regard, substantially the same memory dump method may be obtained by using a hardware virtualization support function and arranging that in a situation where the OS 22 is unable to operate (for example, a double fault), the virtualization support function brings into operation a function (virtualization support code) different from the OS 22, and the memory dump instruction is sent to the processor core 1 in that function.

Substantially the same memory dump method may also be obtained by arranging that, differently from the virtualization support function, System Management Mode (SMM) conventionally provided in the processor core is entered upon occurrence of the exception in the processor core, and the memory dump instruction is sent to the processor core 1 in code that operates in SMM mode.

That is, the error in the process of the memory dump performing unit 35 may be detected not only by the OS 22 (the processor core 2) but also by other mechanisms including the OS 21 (the processor core 1) and the OS 23 (the processor core 3).

In this embodiment, the error in the process of the memory dump performing unit 35 is detected by the memory dump error detection unit 37.

In this regard, substantially the same memory dump method may be obtained without requiring the memory dump error detection unit 37 by the following arrangement. Upon detection of an error, the error detection unit 34 determines whether or not a memory dump is being performed. If a memory dump is not being performed, the error detection unit 34 instructs the memory dump performing unit 35 to perform the memory dump. If a memory dump is being performed, the error detection unit 34 instructs the core coordination unit 36 to notify a different processor core.

The error detection unit 34 may determine whether or not a memory dump is being performed by determining whether or not the position of code being executed upon detection of the error is located within the code of the memory dump performing unit 35, or by reading a marking in a specific area in the memory device 5 which is marked by the memory dump performing unit 35 at start of a memory dump.

In this embodiment, the OSs on the processor cores 1, 2, and 3 have the same functions. However, substantially the same memory dump method may be obtained by configuring one of the processor cores as a dedicated memory dump processor core having only the core coordination unit and the memory dump performing unit, and arranging that an error occurring during a memory dump of another OS is notified to the dedicated memory dump processor core.

If the memory dump performing unit 350 becomes corrupted while the memory dump performing unit 35 of the processor core 2 is performing a memory dump, part of data of the memory device 5 has already been stored in the HDD device 7 at the time of the corruption.

However, the memory dump performing unit 29 of the processor core 1 cannot ascertain which part of the data has been stored in the HDD device 7 by the memory dump performing unit 35. Therefore, regardless of how far the memory dump has progressed in the memory dump performing unit 35, the memory dump is restarted from the beginning.

In this embodiment, the description has been directed to the memory dump method in the configuration in which the plurality of operating systems (OSs) are operating on the hardware configuration including the plurality of processor cores, the memory shared by each of the processor cores, and the secondary storage device for storing the contents of the memory upon occurrence of a failure. The memory dump method includes the following composing elements.

(1) The OS on each processor core includes the following composing elements:
  (a) a means of storing the contents of the memory in the secondary storage device upon occurrence of a failure;
  (b) a means of detecting an error occurring during the storing into the secondary storage device;
  (c) a means of sending a notification to another processor core by being invoked by the above means (b); and
  (d) a means of invoking the above means (a) upon receiving a notification from another processor core.

Second Embodiment

In this embodiment, description will be directed to a memory dump method in a configuration including a hardware configuration having a plurality of processor cores and an MMU that translates a logical address space into a physical address space, on which a plurality of operating systems (OSs) and applications (APs) are operating.

More specifically, in the memory dump method according to this embodiment, a dedicated memory dump processor core is provided. Each processor core other than the dedicated memory dump processor core can only reference, as a logical memory space, a memory area used by each processor core itself. The dedicated memory dump processor core can reference the entire memory as a logical address space.

In the memory dump method according to this embodiment, when a failure occurs in one of the processor cores, and then an error occurs in a memory dump process in the OS operating on this processor core while the contents of the memory are being stored in a secondary storage device, the error is detected in the processor core performing the memory dump. Then, the processor core that has detected the error instructs the dedicated memory dump processor to perform the memory dump, and the dedicated memory dump processor core stores the contents of the memory in the secondary storage device.

According to the memory dump method in accordance with this embodiment, each processor core other than the dedicated memory dump processor core can only reference, as a logical address space, the memory area used by each processor core itself. Thus, memory dump processing code on the dedicated memory dump processor core is prevented from being corrupted by other processor cores, so that a memory dump can be performed reliably.

Figure 7:
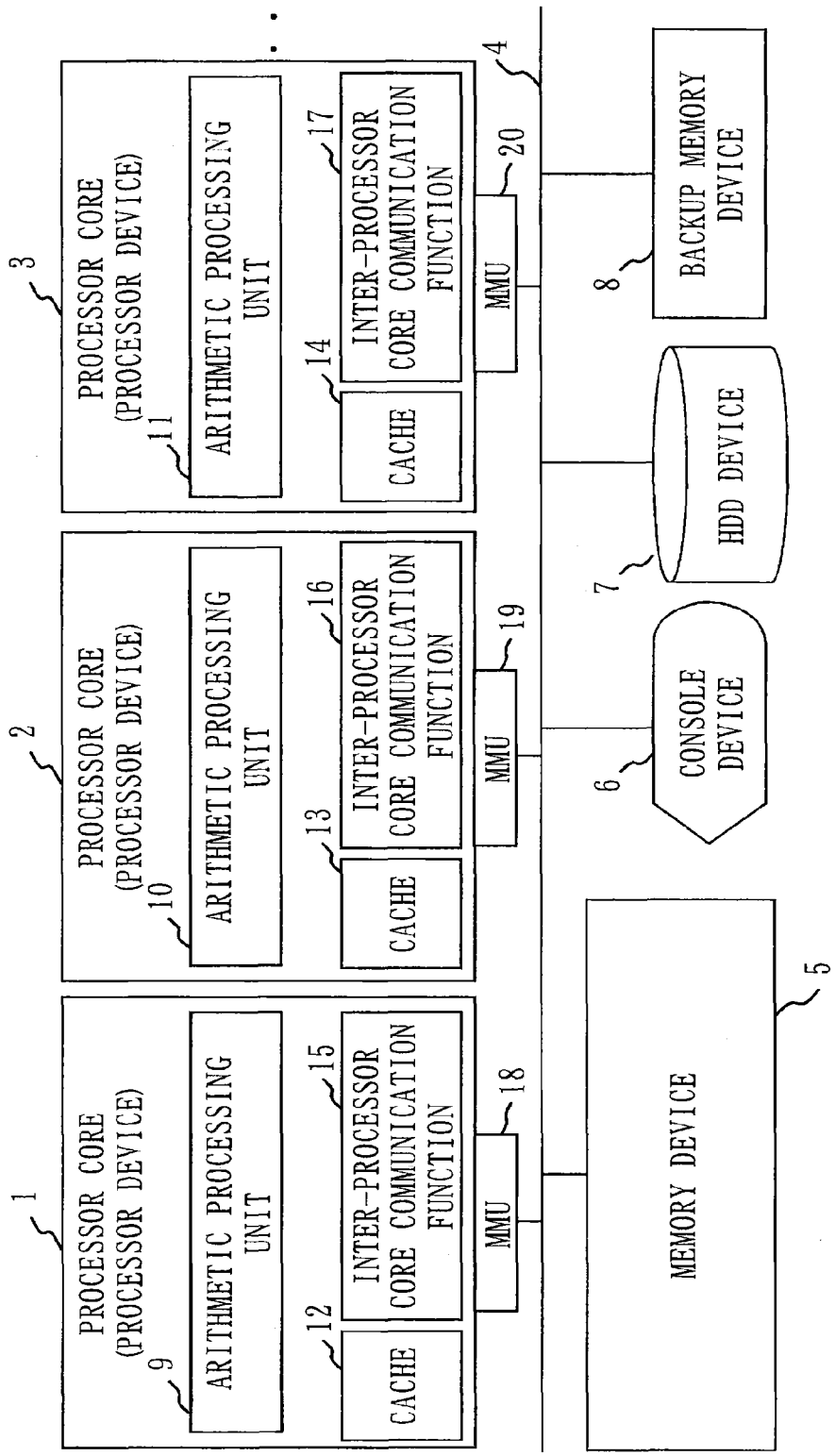
FIG. 7 is a diagram showing an example hardware configuration according to a second embodiment.

FIG. 7 shows an example hardware configuration in the memory dump method according to this embodiment.

In FIG. 7, elements other than MMUs (Memory Management Units) 18, 19, and 20 are the same as those shown in FIG. 1.

Here, description of the elements other than the MMUs 18, 19, and 20 will be omitted.

The MMUs 18, 19, and 20 have a function of translating a logical address into a physical address of the memory device 5, and are used by the processor cores 1, 2, and 3 to logically divide the memory device 5 as address spaces.

By using this MMU, each OS on each processor core can use part of the memory device 5 as a dedicated memory for each OS which cannot be referenced by other processor cores.

In this embodiment, three processor cores are shown. However, the number of processor cores does not have to be three, and operations remain unchanged with two processor cores or four or more processor cores.

Figure 8:
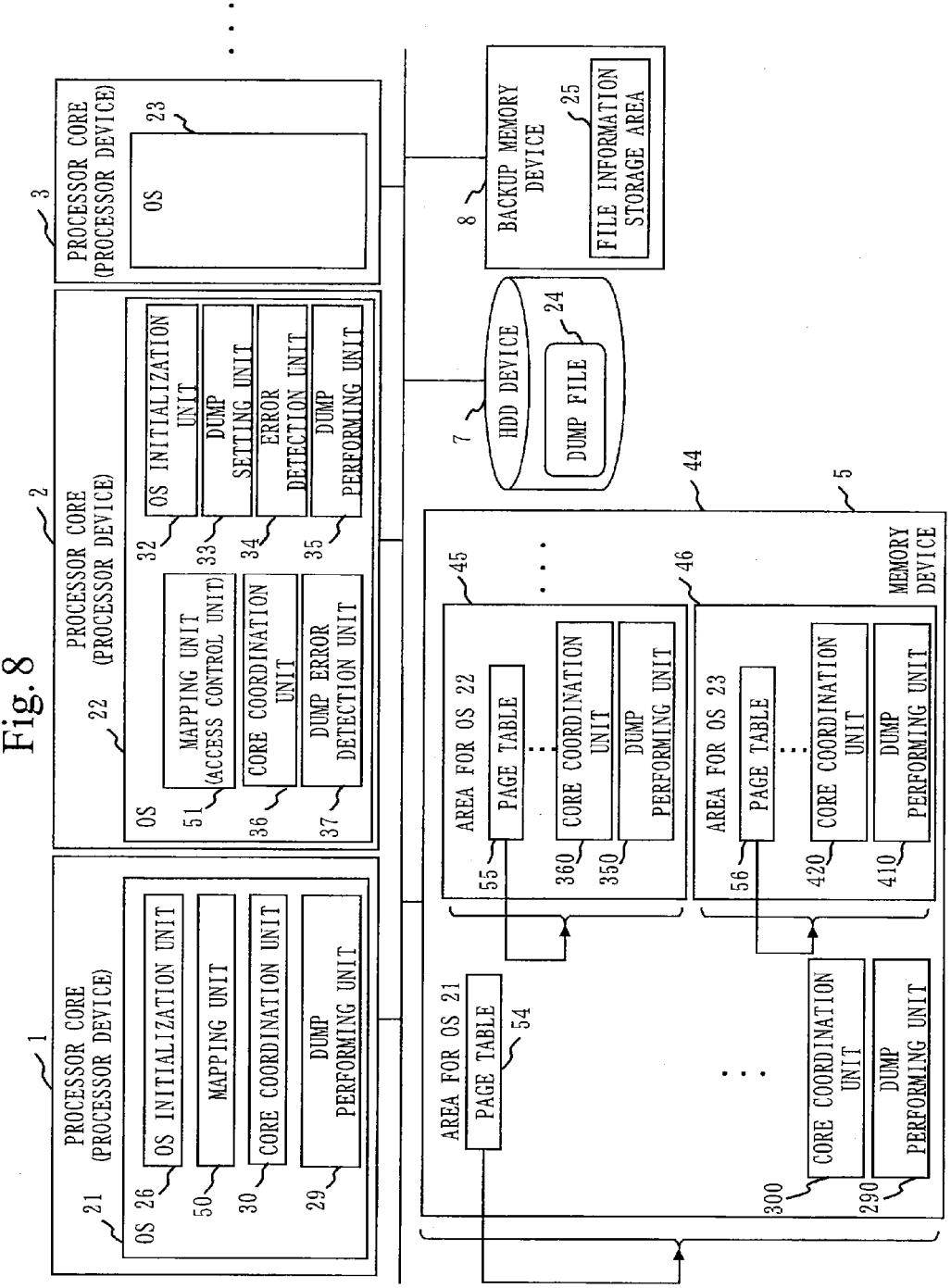
FIG. 8 is a diagram showing an example software configuration according to the second embodiment.

FIG. 8 is a diagram showing an example software configuration corresponding to the hardware configuration shown in FIG. 1.

In FIG. 8, the console device 6 and an internal configuration of the OS 23 of the processor core 3 are omitted from being shown for convenience of illustration.

The internal configuration of the OS 23 of the processor core 3 is the same as that of the OS 22 of the processor core 2.

That is, as described with reference to FIG. 2, the OS 23 includes the OS initialization unit 38, the memory dump setting unit 39, the error detection unit 40, the memory dump performing unit 41, the core coordination unit 42, the memory dump error detection unit 43, and a mapping unit 52 to be described later.

Although description is omitted in FIG. 8, also in this embodiment, the core coordination unit 30, the core coordination unit 36, and the core coordination unit 42 each correspond to an example of the failure detection unit, the memory dump completion notification unit, and the memory dump request unit. The memory dump error detection unit 37 and the memory dump error detection unit 43 correspond to an example of the memory dump request unit.

In a second embodiment, unlike the OSs of the other processor cores, the OS 21 of the processor core 1 has a dedicated function of processing memory dumps and does not include the memory dump setting unit, the error detection unit, and the memory dump error detection unit.

Each OS includes a mapping unit for arranging that the memory device 5 can be referenced (is mapped) on a logical address space by using the MMU of each processor core (the MMU 18 (the processor core 1), the MMU 19 (the processor core 2), the MMU 20 (the processor core 3) of FIG. 7). (The OS 21 includes a mapping unit 50, the OS 22 includes a mapping unit 51, and the OS 23 includes the mapping unit 52 (not shown), respectively.)

The mapping units 50, 51, and 52 specify physical address spaces in the memory device 5 that can be accessed by the respective OSs.

As will be described later, at times other than during a memory dump, a logical address space corresponding to part of the physical address space of the memory device 5 is set for the OS 22 and the OS 23 respectively, so that the OS 22 and the OS 23 can only reference the part of the physical address space.

On the other hand, during a memory dump, the mapping units 51 and 52 set logical addresses corresponding to all physical addresses in the memory device 5 for the respective OSs, so that the memory dump performing units 35 and 41 can reference all the physical addresses in the memory device 5.

The mapping units 51 and 52 are an example of an access control unit.

The memory device 5 also includes a page table for each MMU of each processor core to translate between a logical address space and a physical address space.

It is set in the mapping unit 50 that the MMU 18 of the processor core 1 references a page table 54 located in the area 44 for the OS 21.

In the page table 54, translation information between the logical address space and the physical address space is set. The translation information is set such that reference can be made to the code of each element of the OS 21 (the memory dump performing unit 290, the core coordination unit 300, and so on) and the area 44 for the OS 21 where the page table 54 is stored, that is, reference can be made to the entirety of the memory device 5.

With this arrangement, the processor core 1 can reference the entirety of the memory device 5.

It is set in the mapping unit 51 that the MMU 19 of the processor core 2 references a page table 55 located in the area 45 for the OS 22.

In the page table 55, translation information between the logical address space and the physical address space is set. The translation information is set such that reference can be made only to the code of each element of the OS 22 (the memory dump performing unit 350, the core coordination unit 360, and so on) and the area 45 for the OS 22 where the page table 55 is stored.

With this arrangement, the processor core 2 can reference only the area 45 for the OS 22, and cannot reference the memory dump performing unit 290 in the area 44 for the OS 21 or the area 46 for the OS 23.

In this way, the data in the area for the OS 21 and the area for the OS 23 is prevented from being corrupted in a process in the processor core 2.

Likewise, it is set in the mapping unit 52 that the MMU 20 of the processor core 3 references a page table 56 located in the area 46 for the OS 23.

In the page table 56, translation information between the logical address space and the physical address space is set. The translation information is set such that reference can be made only to the code of each element of the OS 23 (the memory dump performing unit 410, the core coordination unit 420, and so on) and the area 46 for the OS 23 where the page table 56 is stored.

With this arrangement, the processor core 3 can reference only the area 46 for the OS 23, and cannot reference the memory dump performing unit 290 in the area 44 for the OS 21 or the area 45 for the OS 22.

In this way, the data in the area for the OS 21 and the area for the OS 22 is prevented from being corrupted in a process in the processor core 3.

Example operations of the memory dump method in this embodiment upon occurrence of a failure will now be described with reference to arrows in FIGS. 9 and 10 and flowcharts of the FIGS. 11 and 12.

Figure 9:
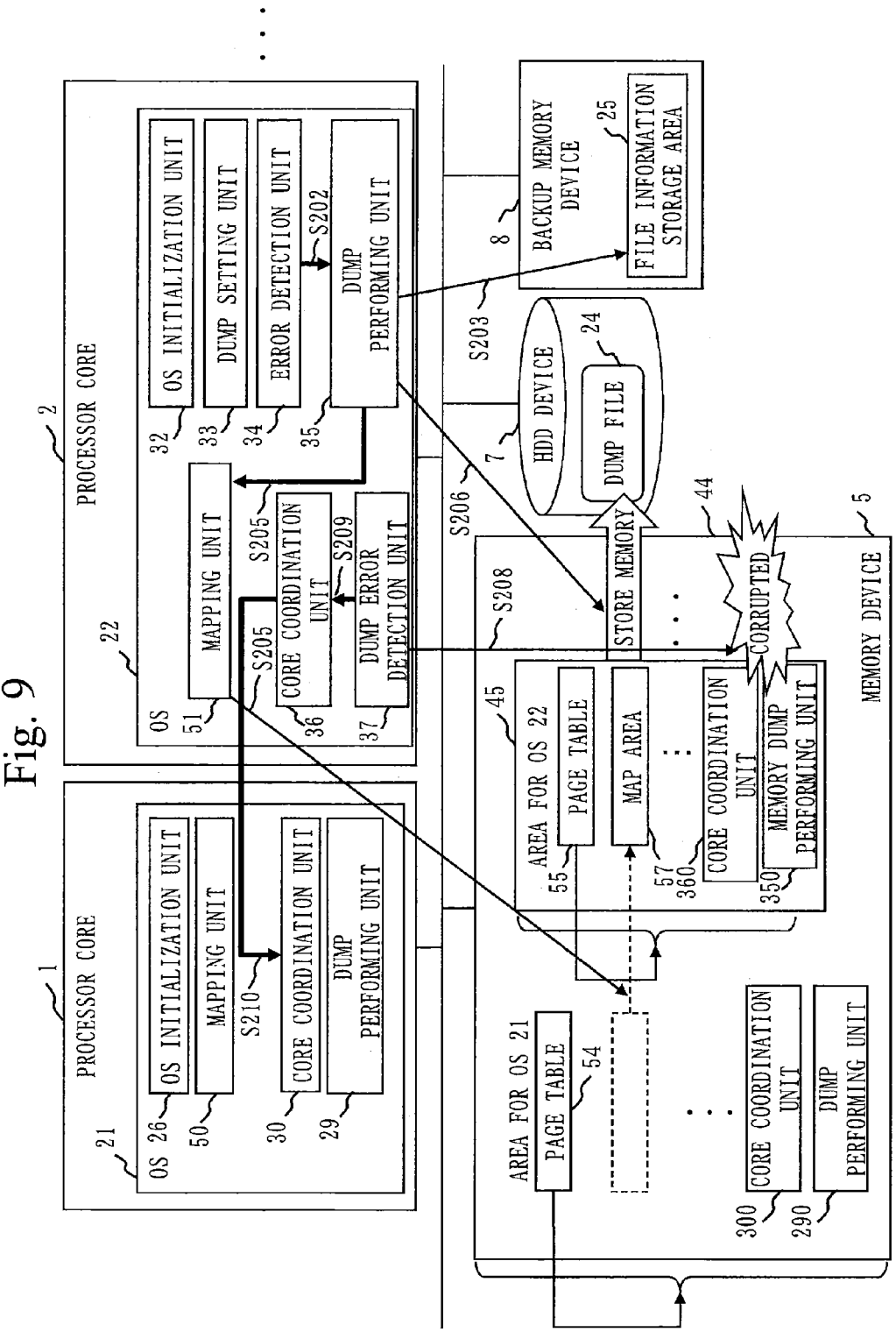
FIG. 9 is a diagram showing example operations upon occurrence of a failure according to the second embodiment.
Figure 10:
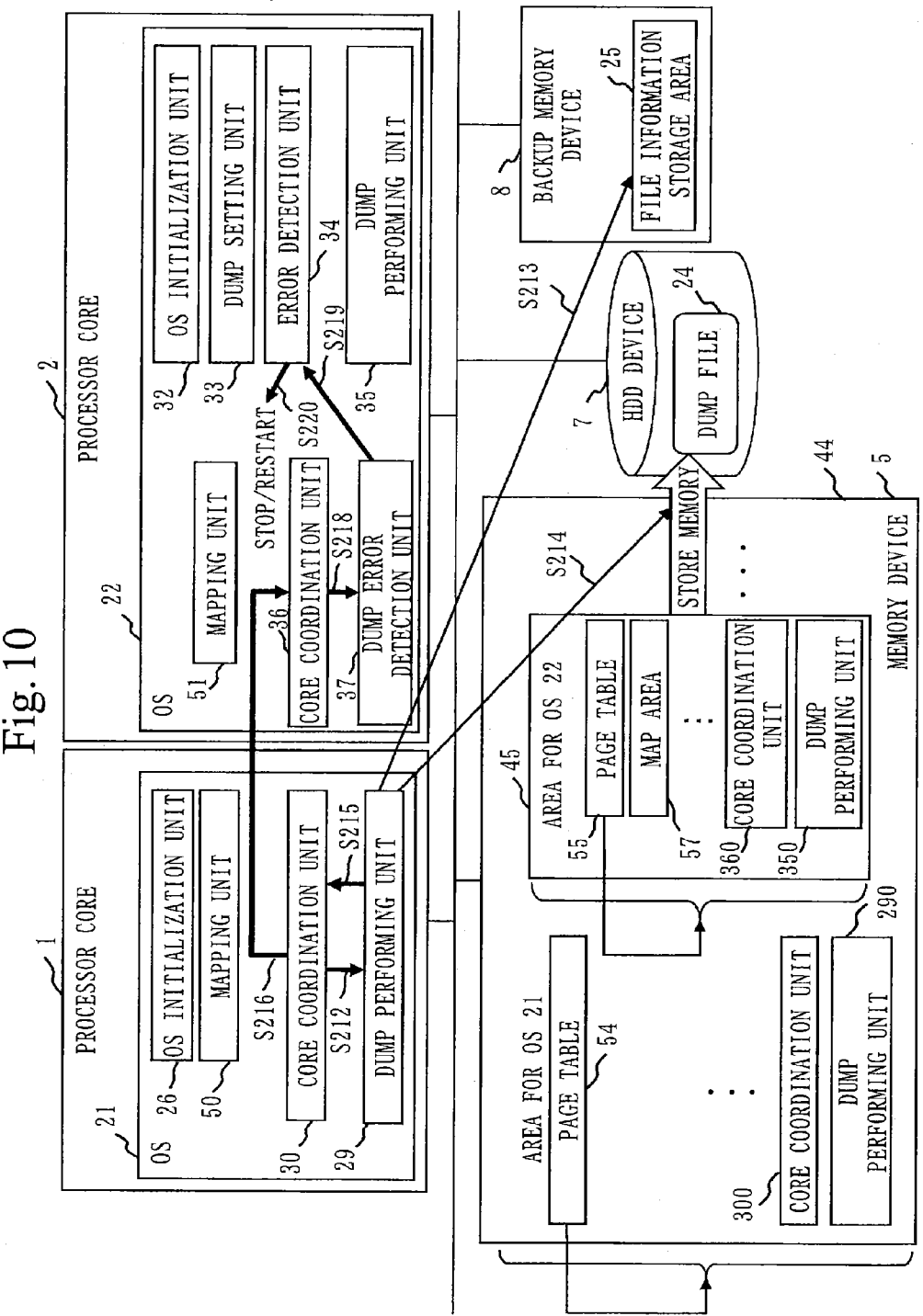
FIG. 10 is a diagram showing example operations upon occurrence of a failure according to the second embodiment.

In FIGS. 9 and 10, the processor core 3, the area 46 for the OS 23 in the memory device 5, and the console device 6 are omitted from being shown for convenience of illustration.

Referring to FIGS. 9 to 12, an example will be described in which a failure occurs in the OS 22 operating on the processor core 2, and data of the memory dump performing unit 350 in the area 45 for the OS 22, which is code data of the memory dump performing unit 35 of the OS 22 residing on the memory device 5, has been corrupted.

Figure 11:
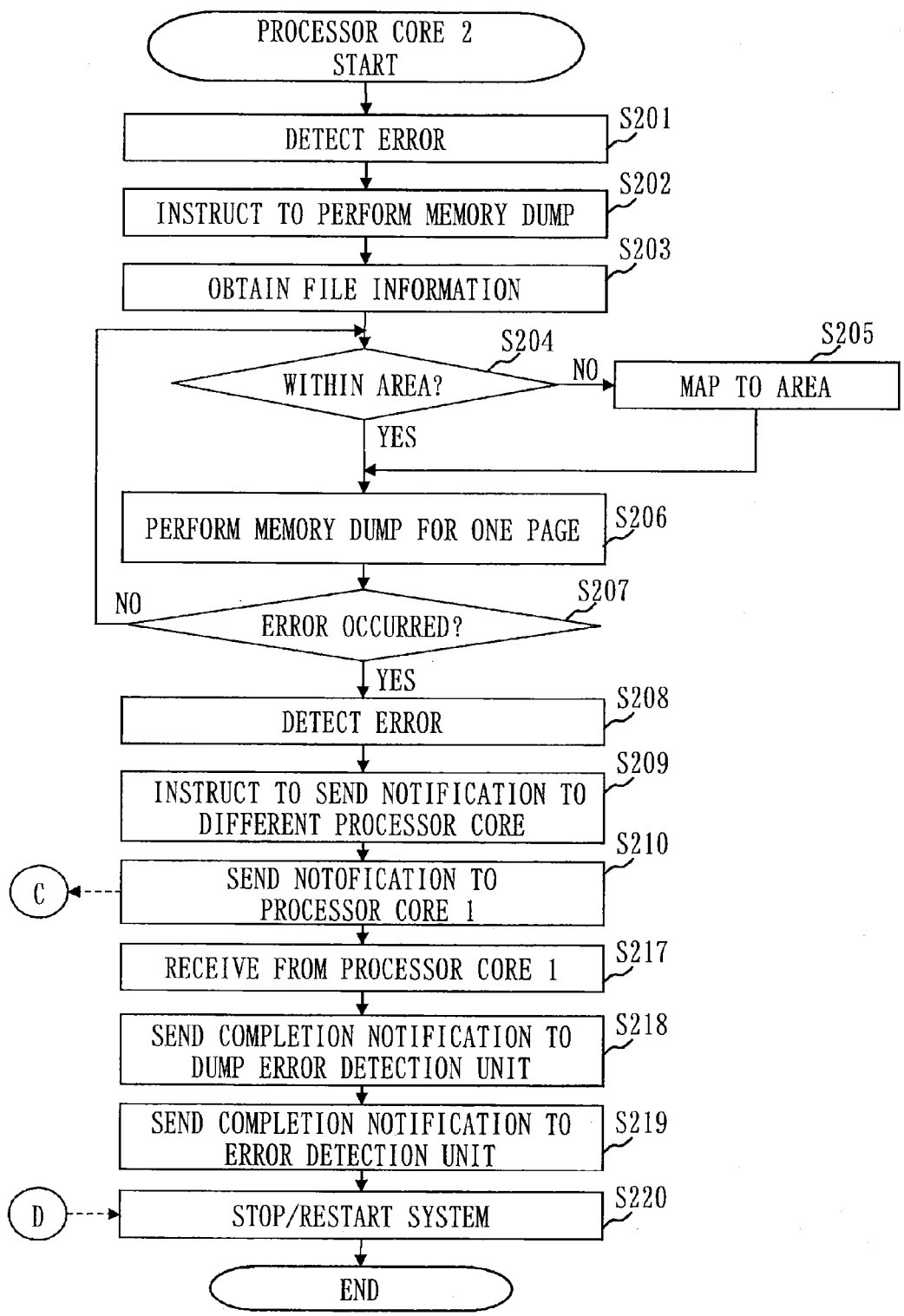
FIG. 11 is a flowchart diagram showing example operations upon occurrence of a failure according to the second embodiment.

First, when a failure occurs during operation of the OS 22, the error detection unit 34 of the OS 22 detects this error (S201 of FIG. 11).

When the error is detected by the error detection unit 34, the error detection unit 34 performs a process to identify a cause of the error and so on, and then sends a memory dump instruction to the memory dump performing unit 35 (S202 of FIGS. 9 and 11).

Upon receiving the memory dump instruction, the memory dump performing unit 35 configures the processor core 2 such that an exception occurring in the processor core 2 in performing a memory dump will be detected by the memory dump error detection unit 37 to prevent the error detection unit 34 from detecting the exception again. Then, the memory dump performing unit 35 obtains from the file information storage area 25 in the backup memory device 8 the position information of the dump file 24 in the HDD device 7 (S203 of FIGS. 9 and 11).

Next, based on the obtained position information, the memory dump performing unit 35 performs a process to write the contents of the memory device 5 to the dump file 24 in the HDD device 7.

In the processor core 2, the MMU 19 operates by using the page table 55 in the area 45 for the OS 22 in the memory device 5. This means that the memory dump performing unit 35 of the OS 22 can only access the area 45 for the OS 22 in the memory device 5.

Thus, the process to write the contents of the memory device 5 is performed as described below.

First, the memory dump performing unit 35 checks to see if the first page of the physical address space of the memory device 5 exists in the area 45 for the OS 22 (S204 of FIG. 11). (Pages are areas of a fixed size (generally 4 Kbytes) dividing an address space).

This determination is made by referencing the page table 55 and based on whether or not desired physical addresses are included in the logical address space of the processor core 2.

If the desired physical addresses are not included in the area 45 for the OS 22 (NO in S204 of FIG. 11), the memory dump performing unit 35 instructs the mapping unit 51 that the physical address space be made to be able to be referenced on the logical address space (a map area 57) of the processor core 2 (S205 of FIGS. 9 and 11).

The mapping unit 51 sets the page table 55 used by the MMU 19 such that the physical address space can be referenced on the logical address space of the processor core 2.

If the desired physical addresses are included in the area 45 for the OS 22 (YES in S204 of FIG. 11), the physical addresses can already be referenced on the logical address space. Thus, no instruction is given to the mapping unit 51.

If the mapping to the area for the OS 22 (S205 of FIGS. 9 and 11) is completed or if reference is already possible (YES in S204 of FIG. 11), then the memory dump performing unit 35 writes to the dump file 24 a page of the logical address space corresponding to the first page of the physical address space (S206 of FIGS. 9 and 11).

If an error has not occurred (NO in S207 of FIG. 11), processes of S204 to S206 are performed in the next page of the physical address space.

If the data of the memory dump performing unit 350 in the area 45 for the OS 22 in the memory device 5 has not been corrupted, the operation of the memory dump performing unit 35 is not hindered. Thus, when all the contents of the memory device 5 in the physical address space have been stored in the dump file 24, the memory dump performing unit 35 completes processing the memory dump properly.

However, if the data of the memory dump performing unit 350 in the area 45 for the OS 22 in the memory device 5 has been corrupted, an error occurs in the operation of the memory dump performing unit 35 (YES in S207 of FIG. 11), causing an exception on the processor core 2 due to an invalid instruction execution or an invalid access.

In this case, the operation of the memory dump performing unit 35 has already been corrupted. Thus, even if the memory dump performing unit 35 is activated again, the memory dump cannot be performed properly.

The exception that has occurred on the processor core 2 is detected by the memory dump error detection unit 37 (S208 of FIGS. 9 and 11).

Upon detection of the error, the memory dump error detection unit 37 instructs the core coordination unit 36 to send a notification (a notification including a memory dump request) to a different processor core (S209 of FIGS. 9 and 11).

Upon being instructed by the memory dump error detection unit 37, the core coordination unit 36 selects a processor core to send the notification to.

In this embodiment, the processor core 1 is configured to have the dedicated function of processing memory dumps, so that the core coordination unit 36 sends the notification to the processor core 1 (S210 of FIGS. 9 and 11).

Figure 12:
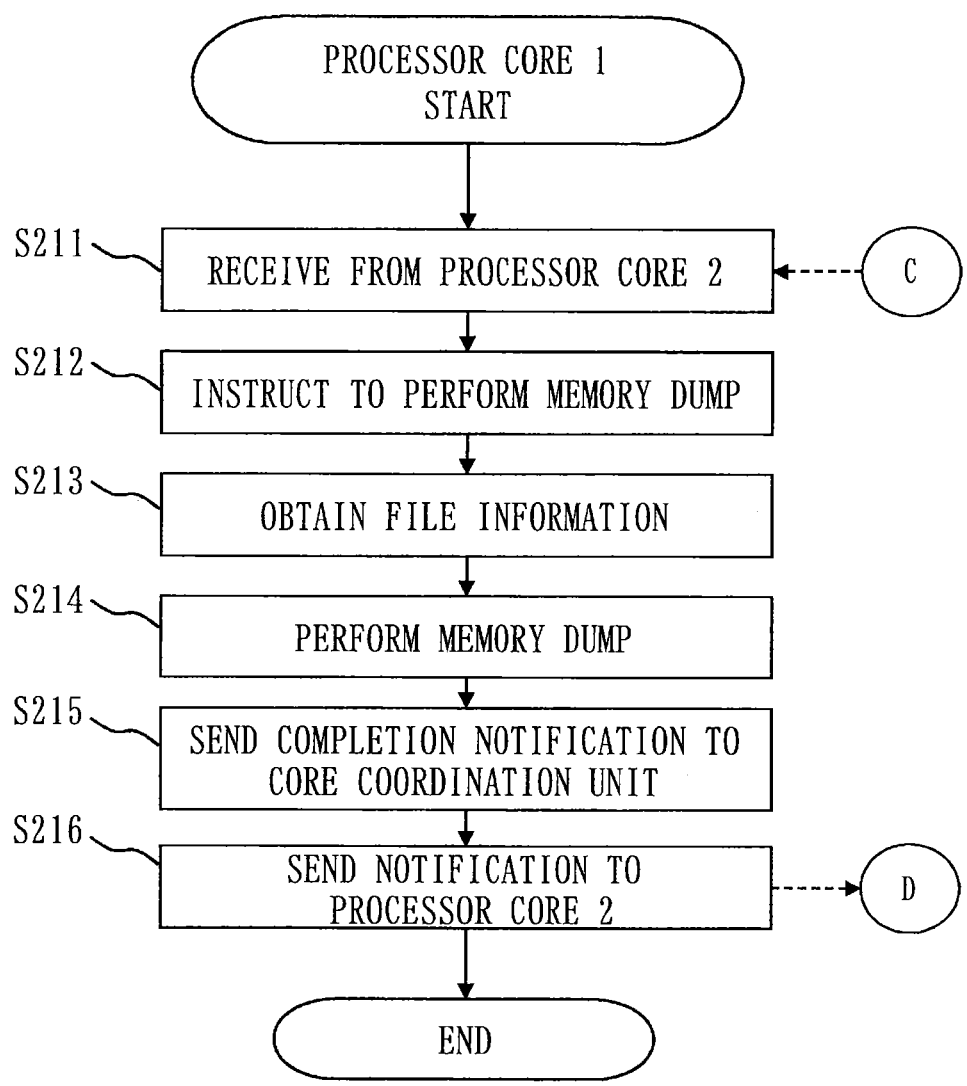
FIG. 12 is a flowchart diagram showing example operations upon occurrence of a failure according to the second embodiment.

This notification is received by the core coordination unit 30 of the processor core 1 (S211 of FIG. 12).

Upon receiving the notification from the core coordination unit 36 of the processor core 2, the core coordination unit 30 of the processor core 1 instructs the memory dump performing unit 29 to perform the memory dump (S212 of FIGS. 10 and 12).

The memory dump performing unit 29 obtains from the file information storage area 25 in the backup memory device 8 the position information of the dump file 24 in the HDD device 7 (S213 of FIGS. 10 and 12). Based on the obtained position information, the memory dump performing unit 29 writes the contents of the memory device 5 to the dump file 24 in the HDD device 7 (S214 of FIGS. 10 and 12).

Although the data of the memory dump performing unit 350 in the area 45 for the OS 22 in the memory device 5 has been corrupted, this does not hinder the operation of the memory dump performing unit 290 in the area 44 for the OS 21 in the memory device 5, so that the memory dump performing unit 29 completes the memory dump properly.

The page table 54 in the area 44 for the OS 21 is set such that the processor core 1 can reference the entirety of the memory device 5 as the logical address space, so that there is no need to invoke the mapping unit 50.

Upon completion of the memory dump, the memory dump performing unit 29 sends a memory dump completion notification to the core coordination unit 30 (S215 of FIGS. 10 and 12).

The core coordination unit 30 sends a processing completion notification to the processor core 2 from which the initial notification originated (S216 of FIGS. 10 and 12).

This notification is received by the core coordination unit 36 of the processor core 2 (S217 of FIG. 11).

Upon receiving the notification from the core coordination unit 30 of the processor core 1, the core coordination unit 36 of the processor core 2 sends a processing completion notification to the memory dump error detection unit 37 (S218 of FIGS. 10 and 11).

Upon receiving this notification, the memory dump error detection unit 37 sends a processing completion notification to the error detection unit 34 (S219 of FIGS. 10 and 11).

Upon receiving the notification, because the contents of the memory have been stored, the error detection unit 34 stops or restarts the device (S220 of FIGS. 10 and 11).

The above has described the operations of the memory dump method in this embodiment upon occurrence of a failure.

In the memory dump method according to the second embodiment, the MMU that translates the logical address space into the physical address space is used. It is arranged that each processor core operates on the logical address space such that the processor core performing regular operation can only reference a specific memory area that can be used by the OS operating on this processor core, and only the processor core dedicated to performing memory dumps can reference the entirety of the memory.

In the memory dump method according to the second embodiment, when a failure occurs in one of the processor cores, and then an error occurs in the memory dump performing unit while the contents of the memory are being stored in the secondary storage device by the OS operating on this processor core, the error is detected by the processor core performing the memory dump. Then, the processor core that has detected the error instructs the dedicated memory dump processor core to perform the memory dump, and the memory dump performing unit on the dedicated memory dump processor core stores the contents of the memory in the secondary storage device.

Therefore, in the memory dump method according to the second embodiment, a memory dump can be performed reliably even if a failure occurs during a memory dump process.

In this embodiment, each processor core performing regular operation can only reference a specific memory area that can be used by the OS operating on that processor core, and only the processor core dedicated to performing memory dumps can reference the entirety of the memory. Thus, even if an abnormal situation where data in the memory becomes corrupted occurs in the processor core performing regular operation, this does not affect code operating on the processor core dedicated to performing memory dumps.

In this embodiment, the description has been directed to the memory dump method in which each processor core has the MMU (Memory Management Unit) that can divide the memory and manage each memory as a different address space. The memory dump method includes the following composing elements.

(1) The OS on one processor core has the following composing element:
(a) a means of allowing access to the entirety of the memory by using the MMU.

(2) The OS on each processor core other than the above (1) has the following composing elements:
(a) a means of allowing access to only a specific memory area by using the MMU;
(b) a means of allowing access to contents of other memory upon occurrence of a failure; and
(c) a means of sending a notification to the processor core of the above (1) upon occurrence of an error during storing into the secondary storage device.

Third Embodiment

In a memory dump method according to this embodiment, a dedicated memory dump processor core regularly monitors states of other processor cores. Upon detection of an error, the dedicated memory dump processor core itself stops a processor core in which the error is detected and performs a memory dump.

According to the memory dump method in accordance with this embodiment, a memory dump can be performed reliably even if a failing processor core itself is unable to operate due to a hang-up or the like.

In a third embodiment, a hardware configuration is the same as that of the second embodiment as shown in FIG. 7.

Figure 13:
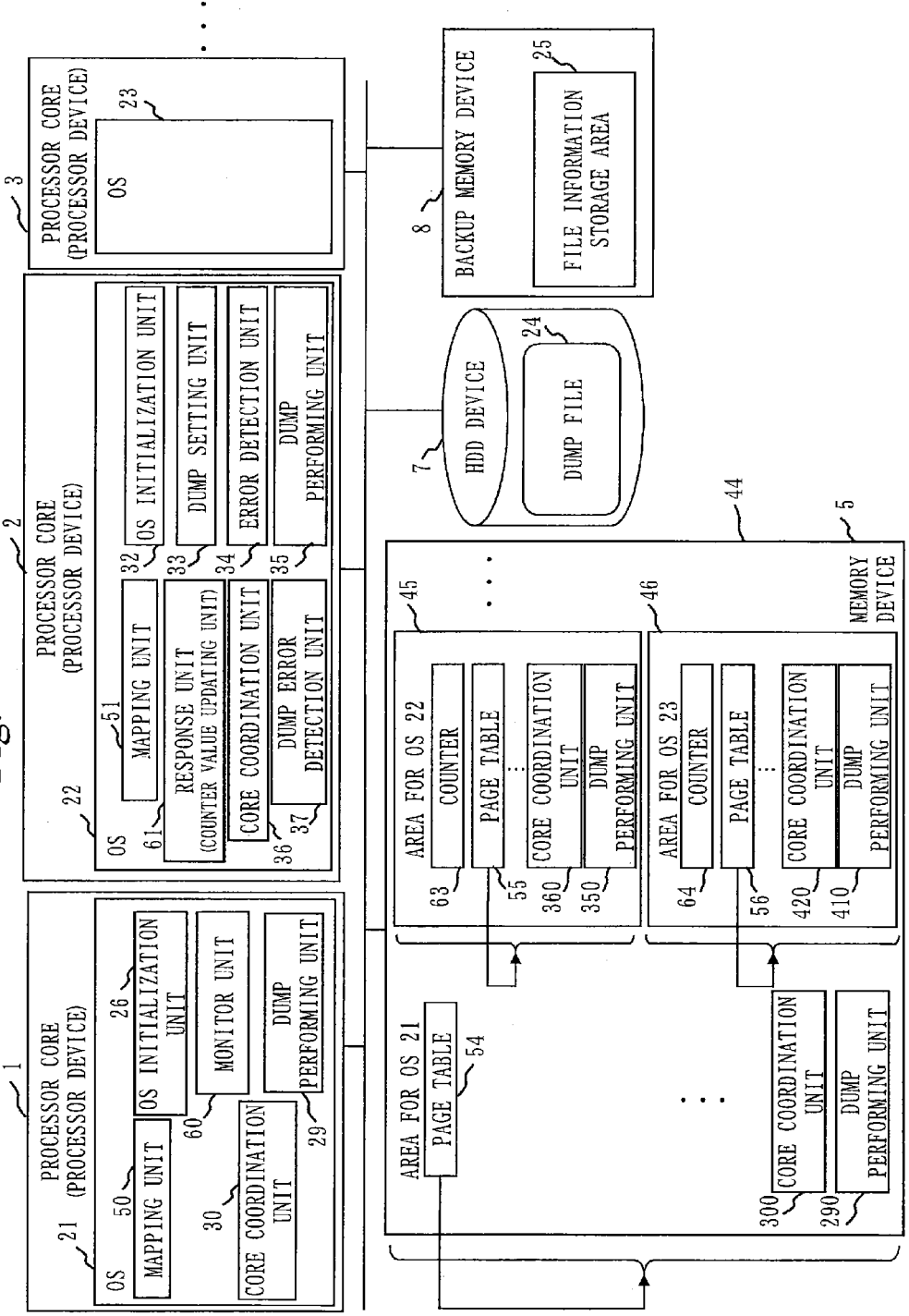
FIG. 13 is a diagram showing an example software configuration according to a third embodiment.

FIG. 13 is a diagram showing an example software configuration corresponding to the hardware configuration shown in FIG. 7.

In the third embodiment, in the OS 21 of the processor core 1, there exists a monitor unit 60 for monitoring states of operation of the OS 22 of the processor core 2 and the OS 23 of the processor core 3.

The monitor unit 60 monitors a counter value of a counter to be described later. This counter value is updated at predetermined intervals while another processor core is operating properly.

When the counter value ceases to be updated, the monitor unit 60 determines that a failure has occurred in the another processor core.

In the OS 22 of the processor core 2, there exists a response unit 61 that indicates that the OS 22 is operating without problem. Likewise, in the OS 23 of the processor core 3, there exists a response unit 62 (not shown).

In the memory device 5, there exist a counter 63 and a counter 64. The counter value of the counter 63 is updated by the response unit 61 to indicate that the OS 22 is operating, and the counter value of the counter 64 is updated by the response unit 62 to indicate that the OS 23 is operating.

That is, while the OS 22 is operating properly, the response unit 61 updates the counter value of the counter 63 at predetermined intervals so as to indicate to the monitor unit 60 that the processor core 2 is operating properly.

Likewise, while the OS 23 is operating properly, the response unit 62 updates the counter value of the counter 64 at predetermined intervals so as to indicate to the monitor unit 60 that the processor core 3 is operating properly.

The response units 61 and 62 are an example of a counter value updating unit.

In the third embodiment, operations upon detection of an error in the error detection units of the processor core 2 and the processor core 3 are the same as those of the second embodiment, and are indicated by arrows in FIGS. 9 and 10 and flowcharts of FIGS. 11 and 12.

Example operations of the memory dump method in this embodiment upon occurrence of a failure will now be described.

Specifically, example operations in an instance where the processor core hangs up, that is, suddenly becomes unable to operate will be described with reference to arrows in FIGS. 14 and 15 and flowcharts of FIGS. 16 and 17.

Figure 14:
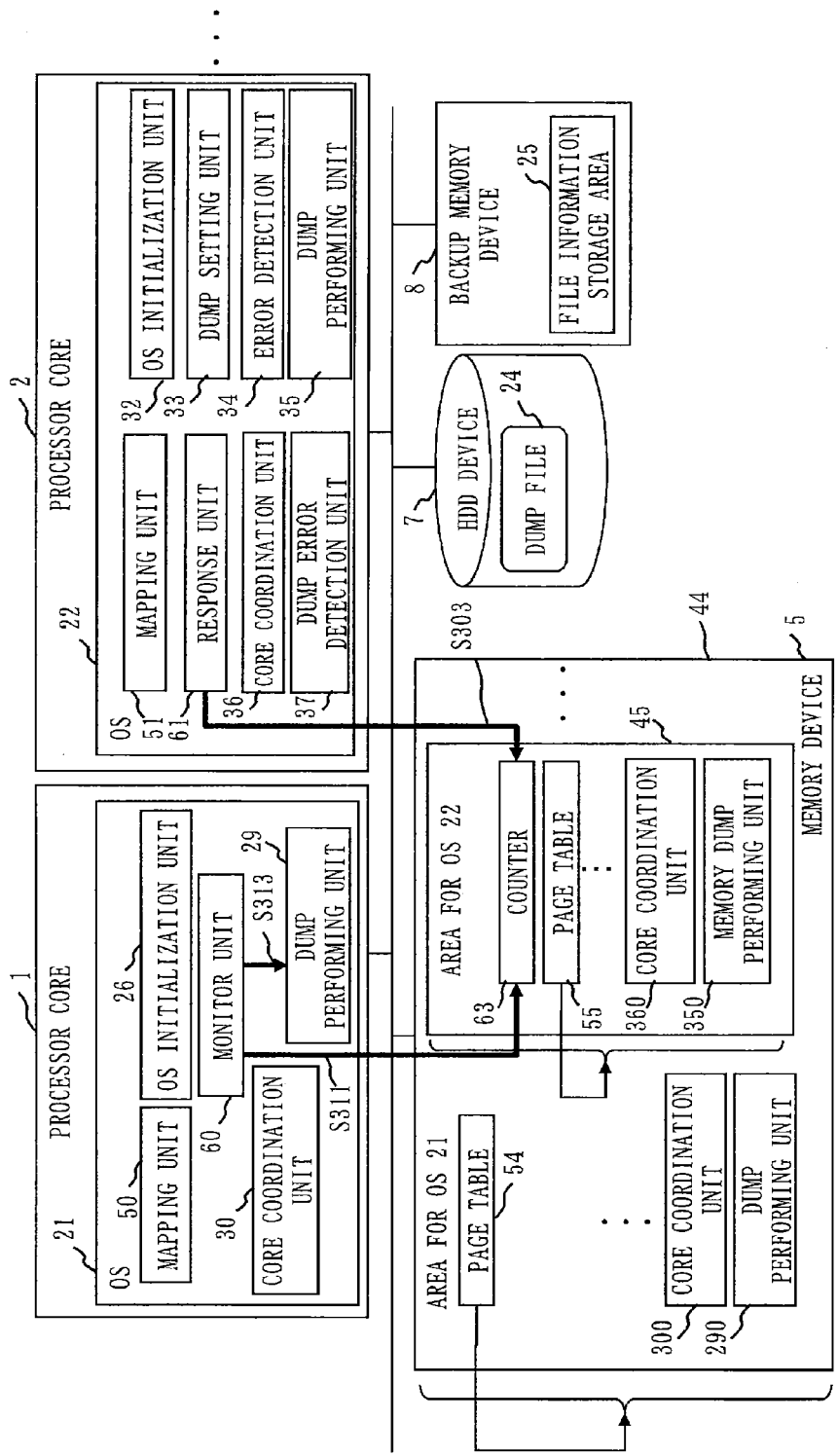
FIG. 14 is a diagram showing example operations upon occurrence of a failure according to the third embodiment.
Figure 15:
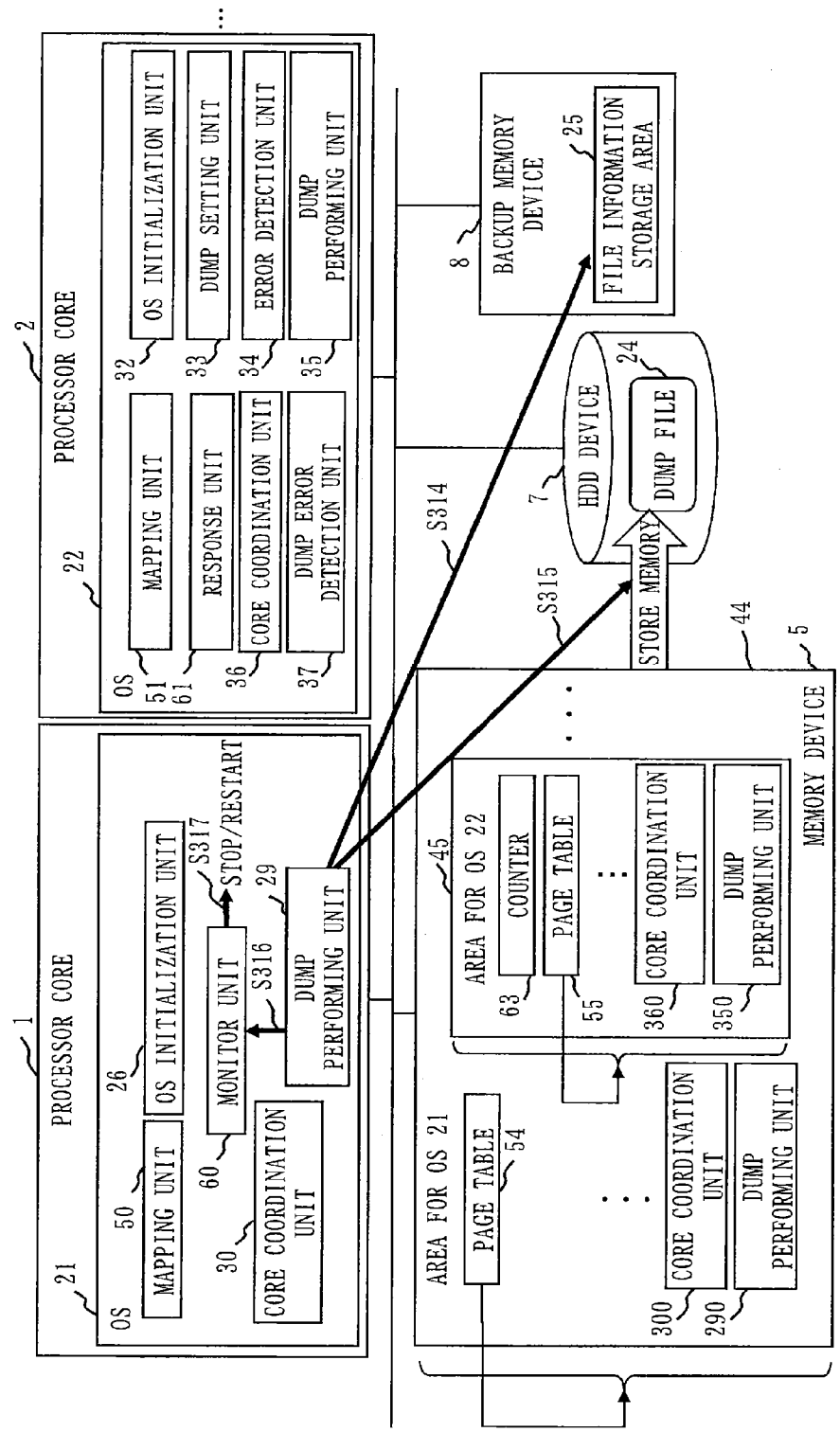
FIG. 15 is a diagram showing example operations upon occurrence of a failure according to the third embodiment.

In FIGS. 14 and 15, the processor core 3, the area 46 for the OS 23 in the memory device 5, and the console device 6 are omitted from being shown for convenience of illustration.

Referring to FIGS. 14 to 17, an example in which the processor core 2 hangs up will be described.

First, operations of the processor core 2 and the processor core 3 while the processor core 2 and the processor core 3 are operating without problem will be described.

Figure 16:
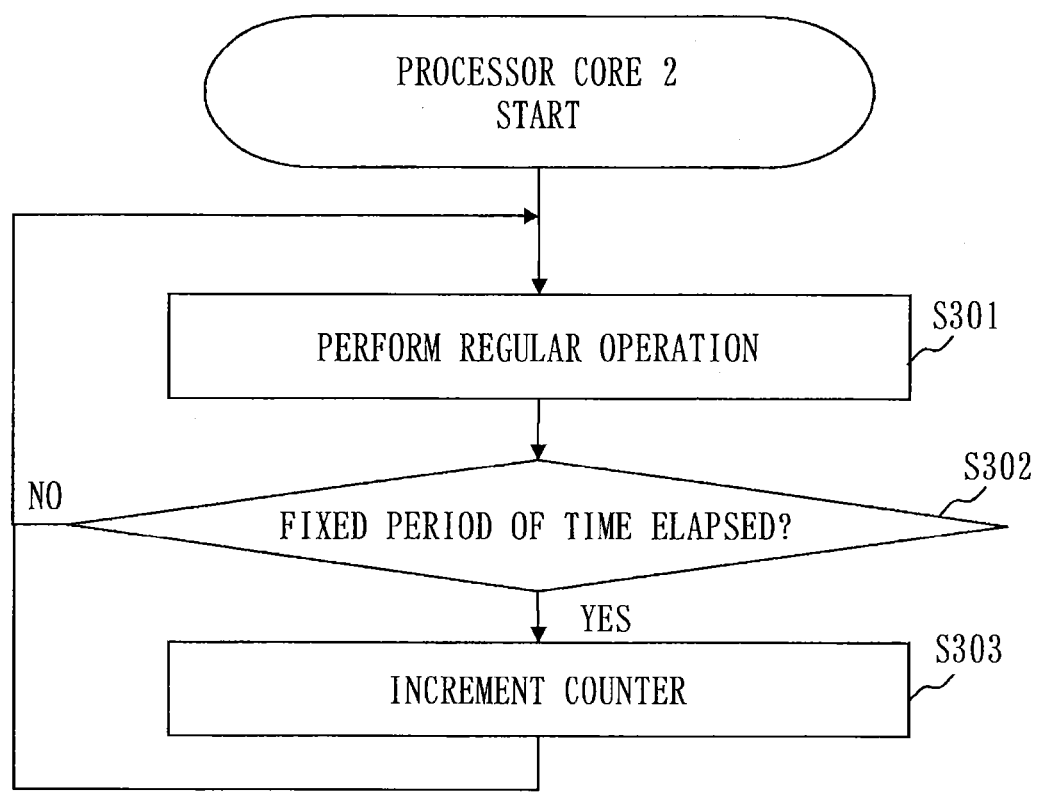
FIG. 16 is a flowchart diagram showing example operations upon occurrence of a failure according to the third embodiment.

When the processor core 2 is operating without problem, the OS 22 of the processor core 2 is performing regular operation in S301 of FIG. 16.

Then, it is checked if a fixed period of time has elapsed (S302 of FIG. 16).

This checking may be activated by monitoring an update state of internal time of the OS or by an interrupt generated by a change in time.

If the fixed period of time has not elapsed in S302 (NO in S302 of FIG. 16), processing returns to S301 and the regular operation is continued.

If the fixed period of time has elapsed in S302 (YES in S302 of FIG. 16), in the OS 22 the response unit 61 operates to increment by one the counter 63 located in the area 45 for the OS 22 in the memory device 5 (S303 of FIGS. 14 and 16).

In this way, the counter 63 is incremented at fixed intervals, and the monitor unit 60 can confirm that the OS 22 is operating by checking the counter 63.

After incrementing the counter 63 in S303, the OS 22 returns to S301 to continue the regular operation.

The above has described the operations of the processor core 2.

The operations in the processor core 3 are the same as the operations of the processor core 2 (S301 to S303) shown in FIGS. 14 and 16, and description will be omitted.

Next, operations of the processor core 1 will be described.

Figure 17:
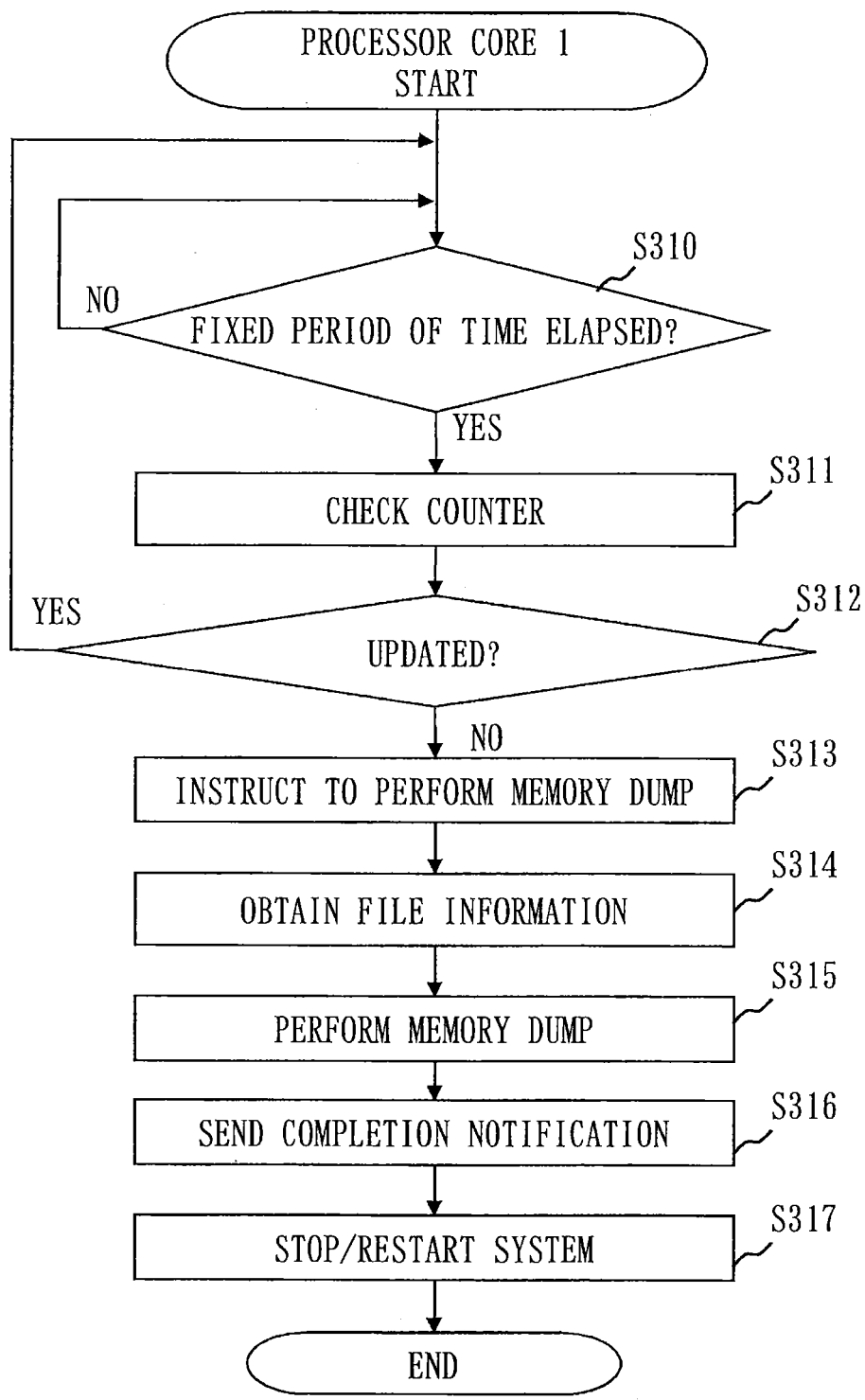
FIG. 17 is a flowchart diagram showing example operations upon occurrence of a failure according to the third embodiment.

First, in the processor core 1 the monitor unit 60 of the OS 21 checks to see if a fixed period of time has elapsed (S310 of FIG. 17).

If the fixed period of time has not elapsed (NO in S310), it is not yet necessary to check the processor core 2 and the processor core 3, so that processing returns to the beginning.

If the fixed period of time has elapsed in S310 (YES in S310), the counter 63 and the counter 64 are checked (S311 of FIGS. 14 and 17).

In FIG. 14, it is only shown that the monitor unit 60 checks the counter 63 in the area 45 for the OS 22. However, the monitor unit 60 also checks the counter 64 in the area 46 for the OS 23 at the same time.

If the values of the counter 63 and the counter 64 have been updated (counted up) properly after the fixed period of time has elapsed (YES in S311 of FIG. 17), it is determined that the processor core 2 and the processor core 3 are operating properly, and processing returns to the beginning.

If the processor core 2 is unable to operate, the counter 63 is not updated by the response unit 61 of the OS 22. As a result, when the updating of the counter 63 is checked in S311, the monitor unit 60 determines that the OS 22 is unable to operate, that is, an error has occurred (NO in S312).

Based on this, the monitor unit 60 sends a memory dump instruction to the memory dump performing unit 29 (S313 of FIGS. 14 and 17).

Based on the instruction from the monitor unit 60, the memory dump performing unit 29 obtains from the file information storage area 25 in the backup memory device 8 the position information of the dump file 24 in the HDD device 7 (S314 of FIGS. 15 and 17). Based on the obtained position information, the memory dump performing unit 29 writes the contents of the memory device 5 to the dump file 24 in the HDD device 7 (S315 of FIGS. 15 and 17).

Although the processor core 2 is unable to operate, this does not hinder the operation of the memory dump performing unit 290 in the area 44 for the OS 21 in the memory device 5, so that the memory dump performing unit 29 completes the memory dump properly.

The page table 54 in the area 44 for the OS 21 is set such that the processor core 1 can reference the entirety of the memory device 5 on the logical address space, so that there is no need to invoke the mapping unit 50.

Upon completion of the memory dump, the memory dump performing unit 29 sends a memory dump completion notification to the monitor unit 60 (S316 of FIGS. 15 and 17).

Upon receiving the notification, because the contents of the memory have been stored, the monitor unit 60 stops or restarts the device (S317 of FIGS. 15 and 17).

The above has described the operations of the memory dump method in this embodiment upon occurrence of a failure.

In the memory dump method according to the third embodiment, each processor core performing regular operation is provided with a means of updating data in the memory at fixed intervals, and the processor core dedicated to performing memory dumps is provided with a means of referencing this data and instructing a memory dump if the data has not been updated.

Therefore, in the memory dump method according to this embodiment, a memory dump can be performed reliably even in a situation where the processor core performing regular operation hangs up in terms of hardware and the error detection unit of the OS is unable to operate.

In this embodiment, whether or not a processor core performing regular operation is operating properly is determined by updating of the data in the memory at regular intervals.

In this regard, substantially the same memory dump method may be obtained by the following arrangement. Using inter-processor core communications, a processor core performing regular operation generates notification interrupts to a memory dump processor core at regular intervals. When the interrupts at regular intervals fail to arrive, the memory dump processor core determines that operation is not being performed properly and performs a memory dump.

In this embodiment, the memory dump method including the following composing elements in each processor core has been described.
(1) The OS on the dedicated memory dump processor core described in the second embodiment has the following composing element:
  (a) a means of checking (2) (a) below and storing the contents of the memory if the value is not updated within a fixed period of time.
(2) The OS on each processor core other than the above processor core (1) has the following composing elements:
  (a) a counter residing in an area in the memory that can be accessed by the processor core itself; and
  (b) a means of updating the counter at fixed intervals during a memory dump.

Fourth Embodiment

In this embodiment, description will be directed to a memory dump method in a configuration including a hardware configuration having a plurality of processor cores and an MMU that translates a logical address space into a physical address space, on which a plurality of operating systems (OSs) and applications (APs) are operating.

More specifically, in the memory dump method according to this embodiment, each processor core can only reference, as a logical address space, a memory space used by each processor core itself. When a failure occurs in one of the processor cores, and then an error occurs in a memory dump process while the contents of the memory are being stored in the secondary storage device by the OS operating on this processor core, the error is detected in the processor core performing the memory dump. Then, the processor core that has detected the error instructs another processor core to perform the memory dump. The OS on the another processor core arranges that the entire memory can be referenced as a logical address space, and then performs the memory dump.

According to the memory dump method in accordance with this embodiment, a memory dump can be performed reliably without providing a dedicated memory dump processor core.

In a fourth embodiment, a hardware configuration is the same as that of the second embodiment as shown in FIG. 7.

Figure 18:
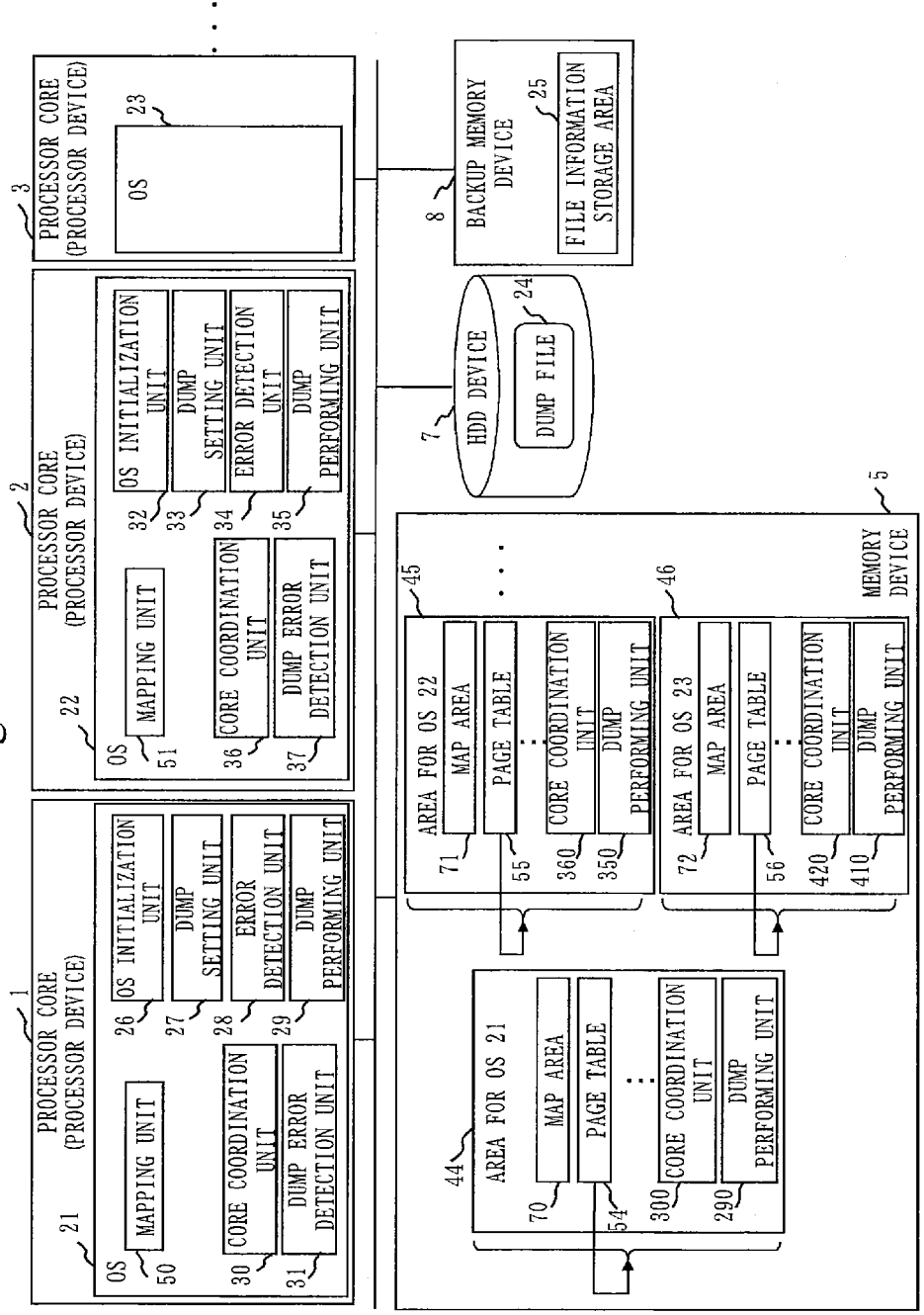
FIG. 18 is a diagram showing an example software configuration according to a fourth embodiment.

FIG. 18 is a diagram showing an example software configuration corresponding to the hardware configuration shown in FIG. 7.

The fourth embodiment differs from the second embodiment in that the processor core 1 is not configured as a dedicated memory dump processor core.

For this reason, as with the first embodiment, the OS 21 of the processor core 1 includes the memory dump setting unit 27, the error detection unit 28, and the memory dump error detection unit 31.

The OS 22 of the processor core 2 and the OS 23 of the processor core 3 are configured as described in the second embodiment.

The memory device 5 is configured differently from the second embodiment. The area 44 for the OS 21 does not cover the entirety of the memory device 5. The page table 54 used by the MMU 18 of the processor core 1 is configured not to overlap with the area 45 for the OS 22 and the area 46 for the OS 23, thereby allowing reference only to the area 44 for the OS 21.

That is, in this embodiment, the processor core 1 is allocated logical addresses corresponding to a subset of physical addresses of the memory device 5. At times other than during a memory dump, the processor core 1 can access only the subset of physical addresses corresponding to the allocated logical addresses.

Each area for each OS in the memory device 5 includes an area for arranging that memory areas outside the area for each OS can be referenced within the area (logical address space) for each OS.

The area 44 for the OS 21 includes a map area 70, the area 45 for the OS 22 includes a map area 71, and the area 46 for the OS 23 includes a map area 72, respectively.

In this embodiment, the memory dump performing units 29, 35, and 41 are also an example of the counter value updating unit.

In this embodiment, in addition to the mapping units 51 and 52, the mapping unit 50 is also an example of the access control unit.

Operations of the memory dump method in this embodiment upon occurrence of a failure will now be described with reference to arrows in FIGS. 19 and 20 and flowcharts of FIGS. 21 and 22.

Figure 19:
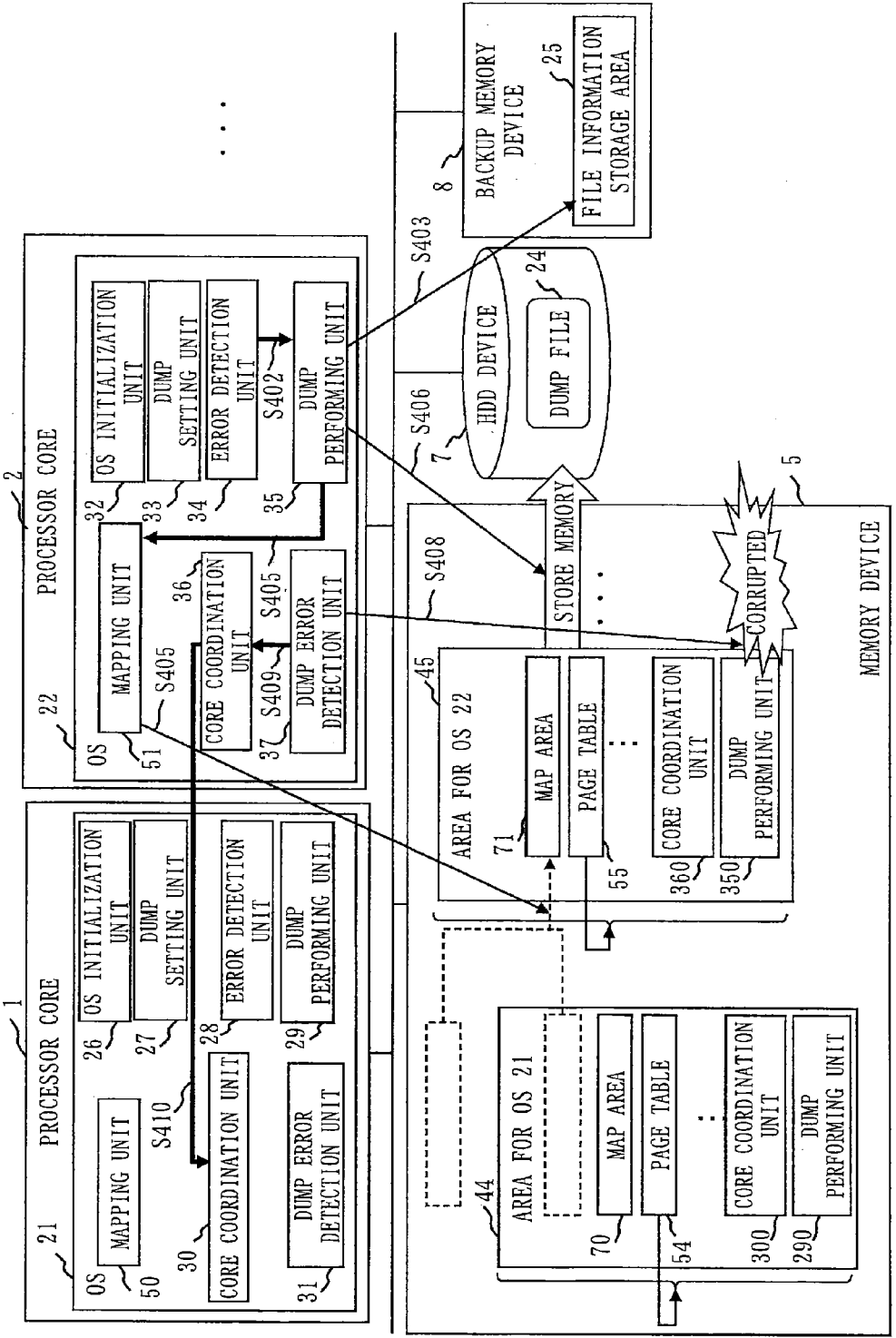
FIG. 19 is a diagram showing example operations upon occurrence of a failure according to the fourth embodiment.
Figure 20:
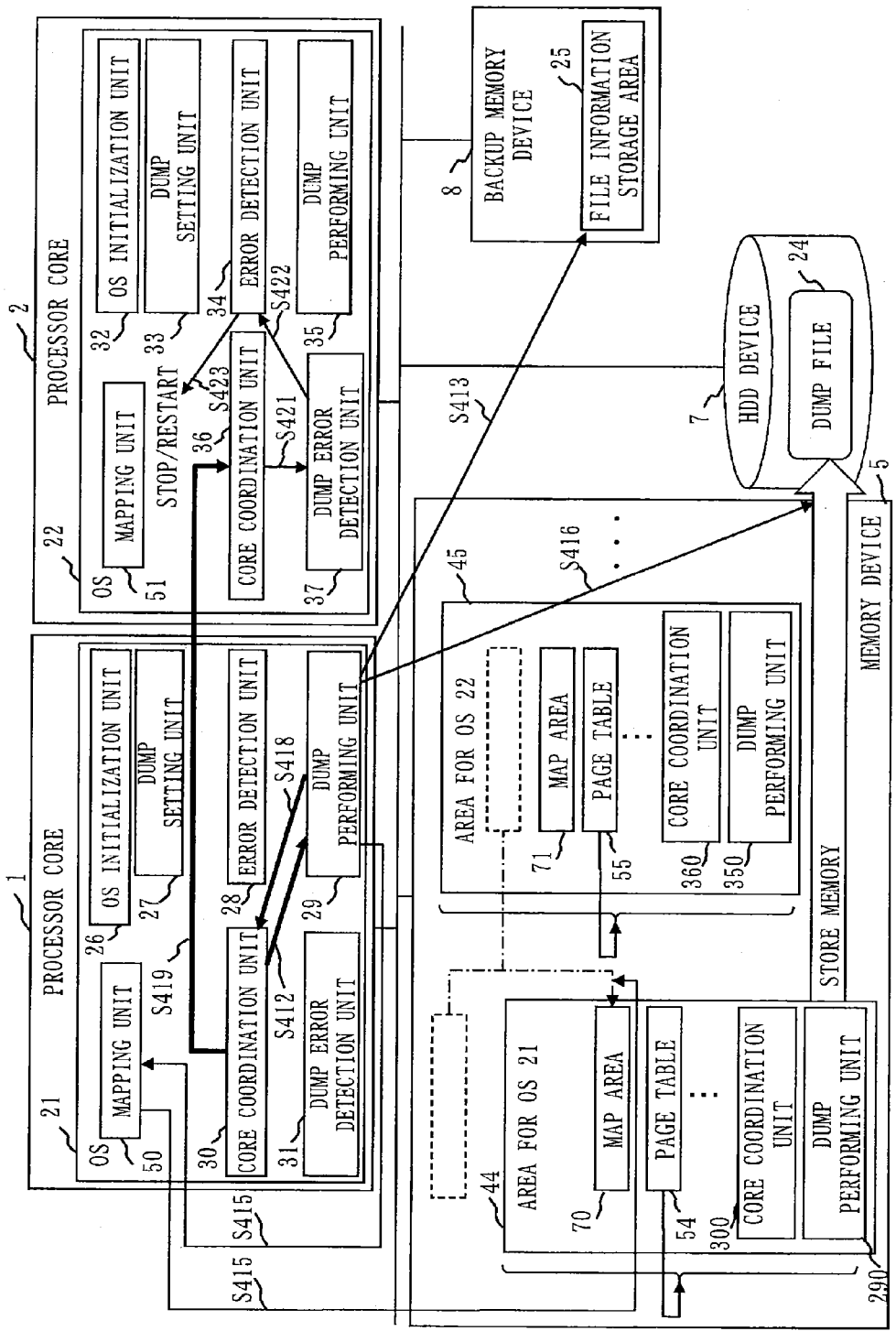
FIG. 20 is a diagram showing example operations upon occurrence of a failure according to the fourth embodiment.

In FIGS. 19 and 20, the processor core 3, the area 46 for the OS 23 in the memory device 5, and the console device 6 are omitted from being shown for convenience of illustration.

Referring to FIGS. 19 to 22, an example will be described in which a failure occurs in the OS 22 operating on the processor core 2, and data of the memory dump performing unit 350 in the area 45 for the OS 22, which is code data of the memory dump performing unit 35 of the OS 22 residing on the memory device 5, has been corrupted.

Figure 21:
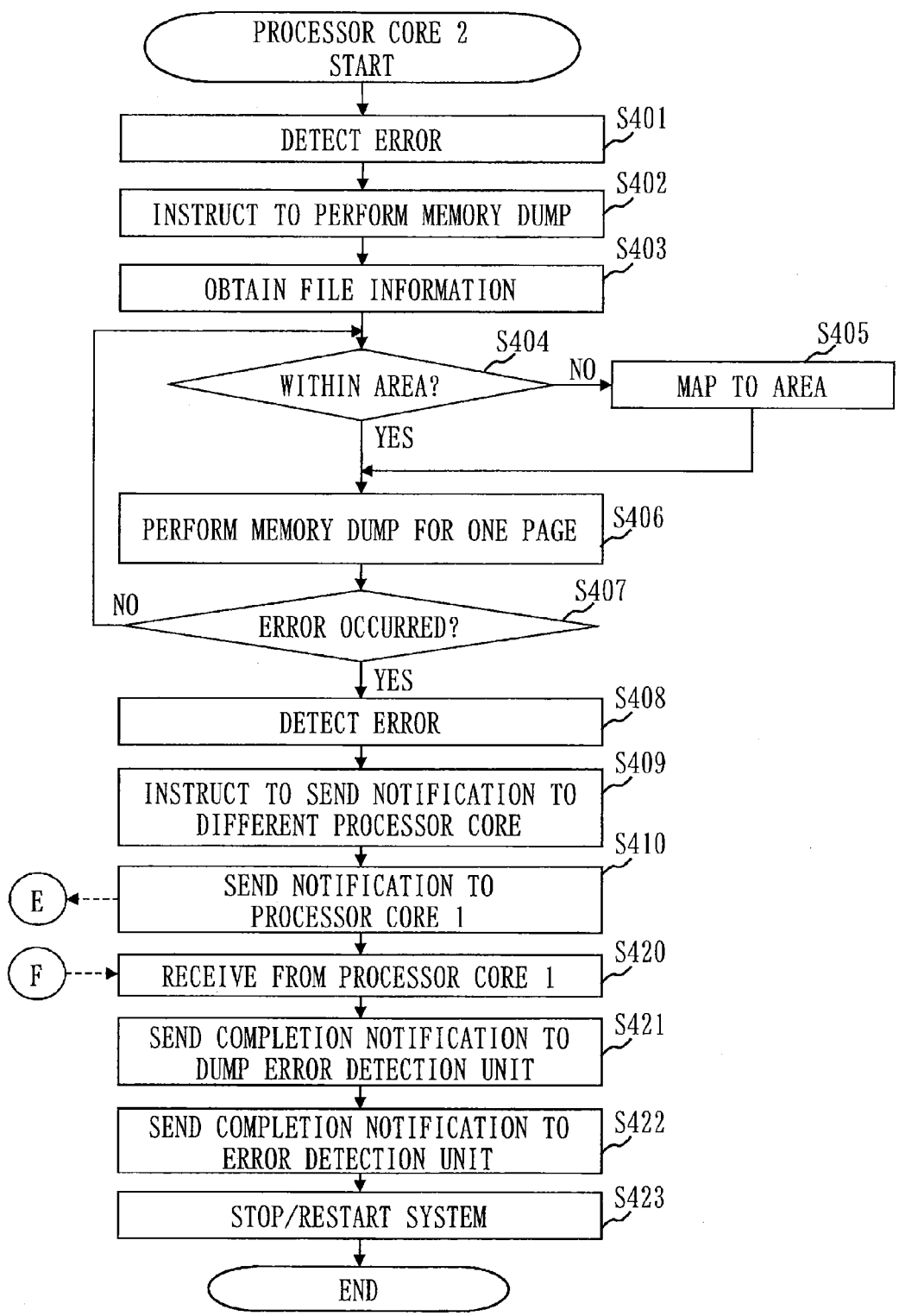
FIG. 21 is a flowchart diagram showing example operations upon occurrence of a failure according to the fourth embodiment.

First, when a failure occurs during operation of the OS 22, the error detection unit 34 of the OS 22 detects this error (S401 of FIG. 21).

When the error is detected by the error detection unit 34, the error detection unit 34 performs a process to identify a cause of the error and so on, and then sends a memory dump instruction to the memory dump performing unit 35 (S402 of FIGS. 19 and 21).

Upon receiving the memory dump instruction, the memory dump performing unit 35 configures the processor core 2 such that an exception occurring in the processor core 2 in performing a memory dump will be detected by the memory dump error detection unit 37 to prevent the error detection unit 34 from detecting the exception again. Then, the memory dump performing unit 35 obtains from the file information storage area 25 in the backup memory device 8 the position information of the dump file 24 in the HDD device 7 (S403 of FIGS. 19 and 21).

Next, based on the obtained position information, the memory dump performing unit 35 performs a process to write the contents of the memory device 5 to the dump file 24 in the HDD device 7.

In the processor core 2, the MMU 19 operates by using the page table 55 in the area 45 for the OS 22 in the memory device 5. This means that the memory dump performing unit 35 of the OS 22 can only access the area 45 for the OS 22 in the memory device 5.

Thus, the process to write the contents of the memory device 5 is performed as described below.

First, the memory dump performing unit 35 checks to see if the first page of the physical address space of the memory device 5 exists in the area 45 for the OS 22 (S204 of FIG. 21). (Pages are areas of a fixed size (generally 4 Kbytes) dividing an address apace).

This determination is made by referencing the page table 55 and based on whether or not desired physical addresses are included in the logical address space of the processor core 2.

If the desired physical addresses are not included in the area 45 for the OS 22 (NO in S404 of FIG. 21), the memory dump performing unit 35 instructs the mapping unit 51 that the physical address space be made to be able to be referenced on the logical address space (the map area 71) of the processor core 2 (S405 of FIGS. 19 and 21).

The mapping unit 51 sets the page table 55 used by the MMU 19 such that the physical address space can be referenced on the logical address space of the processor core 2.

FIG. 19 shows an example where the first page and the area 44 for the OS 21 are set in the map area 71. By repeating the same process for other areas as well, reference can be made to the entirety of the memory device 5.

If the desired physical addresses are included in the area 45 for the OS 22 (YES in S404 of FIG. 21), the physical addresses can already be referenced on the logical address space. Thus, no instruction is given to the mapping unit 51.

If the mapping to the area 45 for the OS 22 (S405 of FIGS. 19 and 21) is completed, or reference is already possible (YES in S404 of FIG. 21), then the memory dump performing unit 35 writes to the dump file 24 a page in the logical address space corresponding to the first page of the physical address space (S406 of FIGS. 19 and 21).

If an error has not occurred (NO in S407 of FIG. 21), processes in S404 to S406 are performed in the next page of the physical address space.

If the data of the memory dump performing unit 350 in the area 45 for the OS 22 in the memory device 5 has not been corrupted, the operation of the memory dump performing unit 35 is not hindered. Thus, when all the contents of the memory device 5 in the physical address space have been stored in the dump file 24, the memory dump performing unit 35 completes processing the memory dump properly.

However, if the data of the memory dump performing unit 350 in the area 45 for the OS 22 in the memory device 5 has been corrupted, an error occurs in the operation of the memory dump performing unit 35 (YES in S407 of FIG. 21), causing an exception on the processor core 2 due to an invalid instruction execution or an invalid access.

In this case, the operation of the memory dump performing unit 35 has already been corrupted, so that even if the memory dump performing unit 35 is activated again, the memory dump cannot be performed properly.

The exception that has occurred on the processor core 2 is detected by the memory dump error detection unit 37 (S408 of FIGS. 19 and 21).

Upon detection of the error, the memory dump error detection unit 37 instructs the core coordination unit 36 to send a notification (a notification including a memory dump request) to a different processor core (S409 of FIGS. 19 and 21).

Upon being instructed by the memory dump error detection unit 37, the core coordination unit 36 selects a processor core to send the notification to.

In this embodiment, the notification is sent to the processor core 1 (S410 of FIGS. 19 and 21).

As described in the first embodiment, methods of selecting a processor core includes selecting a specific processor core that is predetermined, selecting a processor core with the lowest load based on load conditions of the respective processor cores recorded in the memory device 5, and so on.

In this embodiment, using such a method, the core coordination unit 36 of the processor core 2 selects the processor core 1, and sends the notification to the processor core 1 (S410 of FIGS. 19 and 21).

Figure 22:
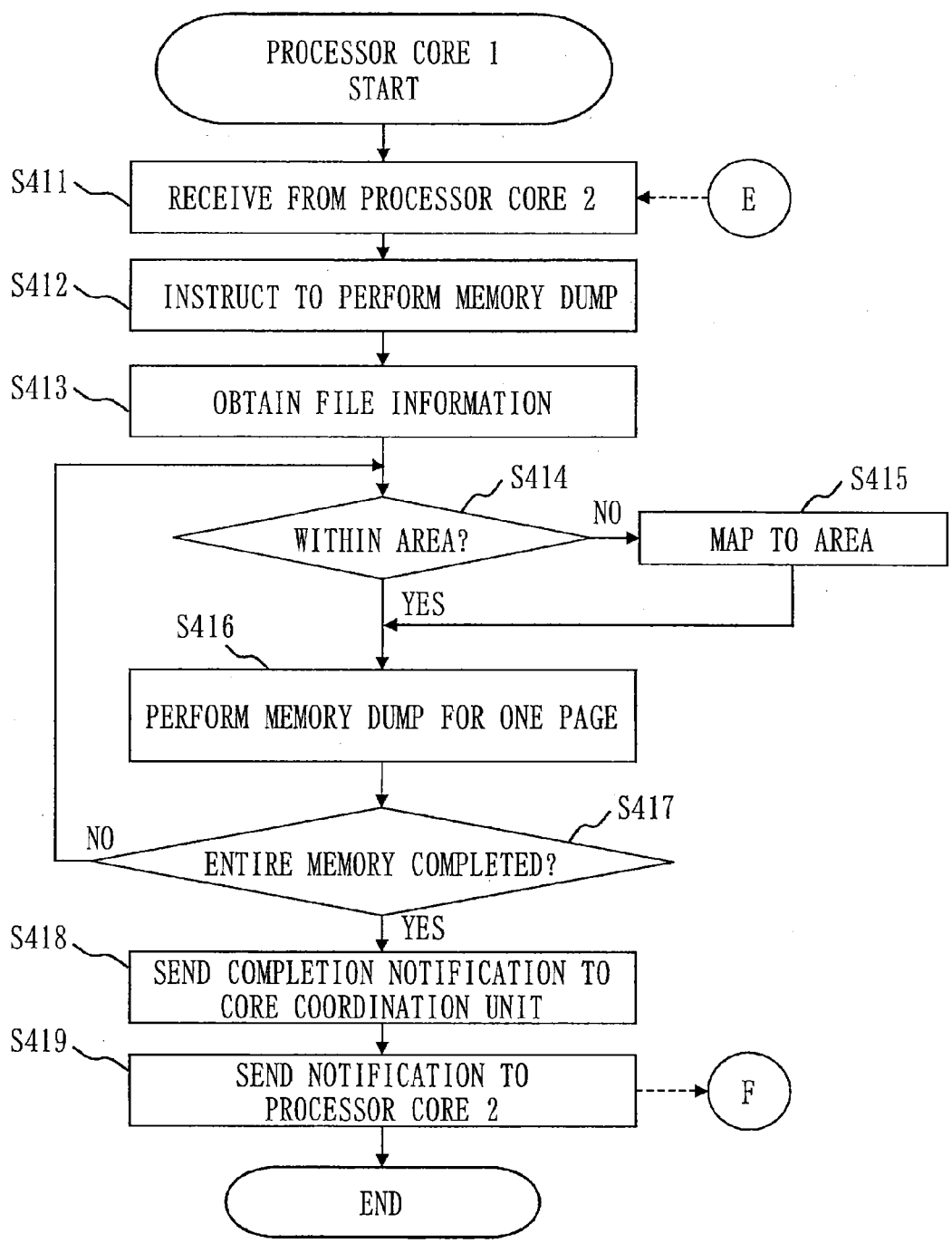
FIG. 22 is a flowchart diagram showing example operations upon occurrence of a failure according to the fourth embodiment.

This notification is received by the core coordination unit 30 of the processor core 1 (S411 of FIG. 22).

Upon receiving the notification from the core coordination unit 36 of the processor core 2, the core coordination unit 30 of the processor core 1 instructs the memory dump performing unit 29 to perform the memory dump (S412 of FIGS. 20 and 22).

The memory dump performing unit 29 obtains from the file information storage area 25 in the backup memory device 8 the position information of the dump file 24 in the HDD device 7 (S413 of FIGS. 20 and 22). Based on the obtained position information, the memory dump performing unit 29 performs a process to write the contents of the memory device 5 to the dump file 24 in the HDD device 7.

In the processor core 1, the MMU 18 operates by using the page table 54 in the area 44 for the OS 21 in the memory device 5. This means that the memory dump performing unit 29 of the OS 21 can only access the area 44 for the OS 21 in the memory device 5.

Thus, the process to write the contents of the memory device 5 is performed as described below.

First, the memory dump performing unit 29 checks to see if the first page of the physical address space in the memory device 5 exists in the area 44 for the OS 21 (S414 of FIG. 22). (Pages are areas of a fixed size (generally 4 Kbytes) dividing an address space.)

This determination is made by referencing the page table 54 and based on whether or not desired physical addresses are included in the logical address space of the processor core 1.

If the desired physical addresses are not included in the area 44 for the OS 21 (NO in S414 of FIG. 22), the memory dump performing unit 29 instructs the mapping unit 50 that the physical address space be made to be able to be referenced on the logical address space (the map area 70) of the processor core 1 (S415 of FIGS. 20 and 22).

The mapping unit 50 sets the page table 54 used by the MMU 18 such that the physical address space can be referenced on the logical address space of the processor core 1.

FIG. 20 shows an example where the first page and the area 45 for the OS 22 are set in the map area 70. By repeating the same process for other areas as well, reference can be made to the entirety of the memory device 5.

If the desired physical addresses are included in the area 44 for the OS 21 (YES in S414 of FIG. 22), the physical addresses can already be referenced on the logical address space. Thus, no instruction is given to the mapping unit 50.

If the mapping to the area 44 for the OS 21 (S415 of FIGS. 20 and 22) is completed or if reference is already possible (YES in S414 of FIG. 22), then the memory dump performing unit 29 writes to the dump file 24 a page of the logical address space corresponding to the first page of the physical address space (S416 of FIGS. 20 and 22).

Then, it is checked whether the memory dump has been performed for the entire area of the memory device 5 (S417 of FIG. 22). If the memory dump has not been performed for the entire area (NO in S417 of FIG. 22), processes in S414 to S416 are performed in the next page of the physical address space.

Although the data of the memory dump performing unit 350 in the area 45 for the OS 22 in the memory device 5 has been corrupted, this does not hinder the operation of the memory dump performing unit 290 in the area 44 for the OS 21 in the memory device 5, so that the memory dump performing unit 29 completes the memory dump properly.

Upon completing the memory dump for the entire area of the memory device 5 (YES in S417 of FIG. 22), the memory dump performing unit 29 sends a memory dump completion notification to the core coordination unit 30 (S418 of FIGS. 20 and 22).

The core coordination unit 30 sends a processing completion notification to the processor core 2 from which the initial notification originated (S419 of FIGS. 20 and 22).

This notification is received by the core coordination unit 36 of the processor core 2 (S420 of FIG. 21).

Upon receiving the notification from the core coordination unit 30 of the processor core 1, the core coordination unit 36 of the processor core 2 sends a processing completion notification to the memory dump error detection unit 37 (S421 of FIGS. 20 and 21).

Upon receiving this notification, the memory dump error detection unit 37 sends a processing completion notification to the error detection unit 34 (S422 of FIGS. 20 and 21).

Upon receiving the notification, because the contents of the memory have been stored, the error detection unit 34 stops or restarts the device (S423 of FIGS. 20 and 21).

The above has described the operations of the memory dump method in this embodiment upon occurrence of a failure.

In the memory dump method according to the fourth embodiment, by using the MMU that translates the logical address space into the physical address space, it is arranged that each processor core operates on the logical address space such that reference can only be made to a specific memory area that can be used by the OS operating on each processor core.

In the memory dump method according to the fourth embodiment, when a failure occurs in one of the processor cores, and then an error occurs in the memory dump performing unit while the contents of the memory are being stored in the secondary storage device by the OS operating on this processor core, the error is detected in the processor core performing the memory dump. Then, the processor core that has detected the error sends a memory dump instruction to a different processor core. Upon receiving the instruction, the memory dump performing unit on the different processor core sets the page table to allow reference to memory areas that this processor core has been unable to reference on the logical address space where this processor core operates, and then stores the contents of the memory in the secondary storage device.

Therefore, in the memory dump method according to the fourth embodiment, a memory dump can be performed reliably without requiring a dedicated memory dump processor core, even if a failure occurs during a memory dump process.

In this embodiment, the description has been directed to the memory dump method having the MMU (Memory Management Unit) that can divide the memory and manage each memory as a different address space. The memory dump method includes the following composing elements.

(1) The OS on each processor core has the following composing elements:

(a) a means of allowing access to only a specific memory area by using the MMU; and (b) a means of allowing access to other memory contents upon occurrence of a failure.

Fifth Embodiment

In a memory dump method according to this embodiment, when a failure occurs in a given processor core while performing a memory dump process, the failing processor core sends a memory dump instruction to another processor core. The failing processor core monitors a memory dump being performed by the another processor core. If processing of the memory dump is not completed within a fixed period of time, the failing processor core stops the another processor core and sends a memory dump instruction to yet another processor core.

In a fifth embodiment, a hardware configuration is the same as that of the first embodiment as shown in FIG. 1.

Figure 23:
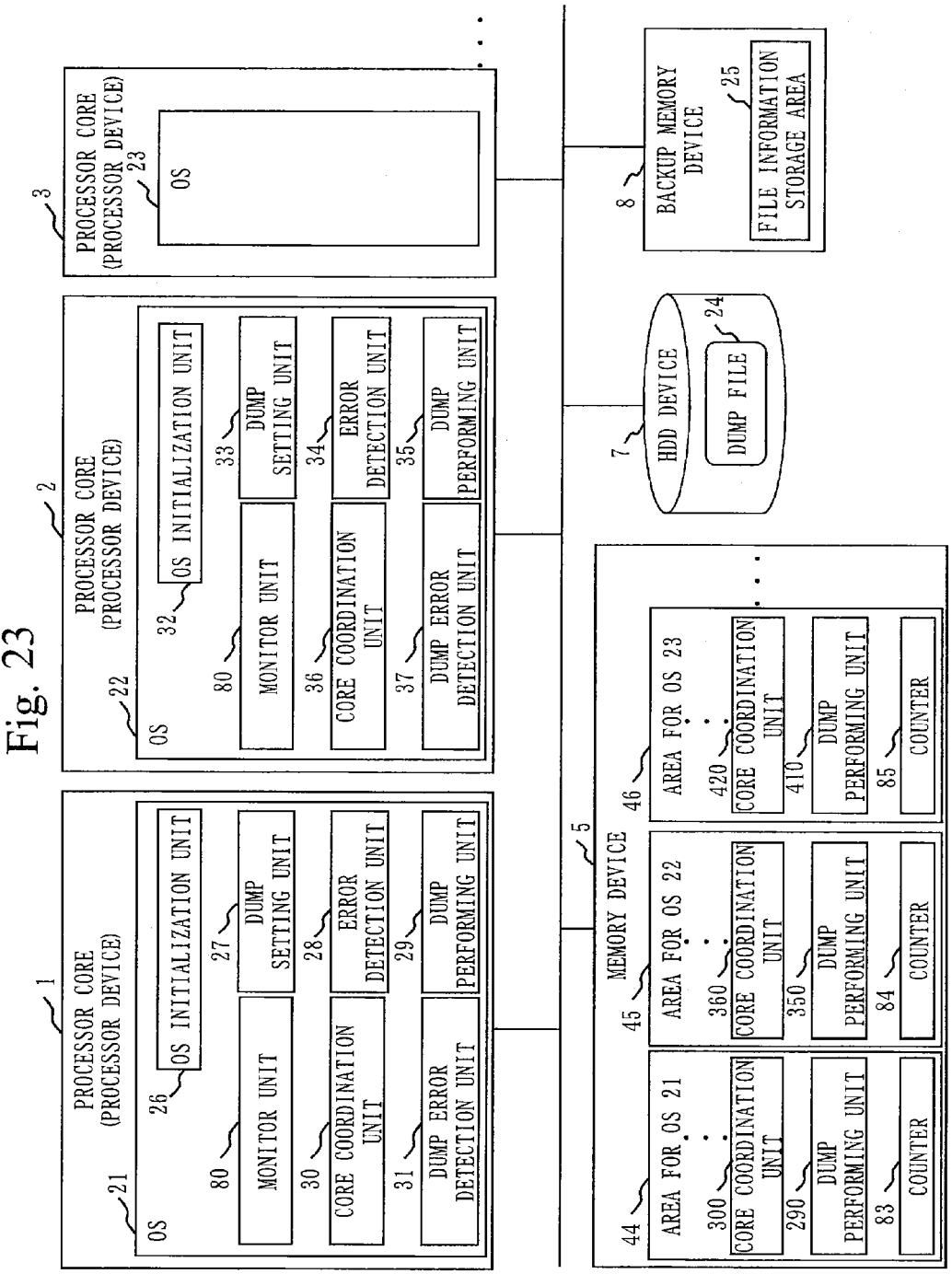
FIG. 23 is a diagram showing an example software configuration according to a fifth embodiment.

FIG. 23 is a diagram showing an example software configuration corresponding to the hardware configuration shown in FIG. 1.

In the fifth embodiment, the OS 21 includes a monitor unit 80, the OS 22 includes a monitor unit 81, and the OS 23 includes a monitor unit 82 (not shown), respectively, in order to monitor a memory dump process being performed in a different processor core.

In the memory device 5, the area 44 for the OS 21 includes a counter 83, the area 45 for the OS 22 includes a counter 84, and the area for the OS 23 includes a counter 85, respectively, as a counter to indicate that a memory dump is continuing in a memory dump process in each processor core.

Other aspects of the configuration are the same as those of the first embodiment.

In this embodiment as well, the core coordination unit 30, the core coordination unit 36, and the core coordination unit 42 each correspond to an example of the failure detection unit, the memory dump completion notification unit, and the memory dump request unit.

Also in this embodiment, the memory dump error detection unit 31, the memory dump error detection unit 37, and the memory dump error detection unit 43 correspond to an example of the memory dump request unit.

Operations of the memory dump method in this embodiment upon occurrence of a failure will now be described with reference to arrows in FIGS. 24, 25 and 26 and flowcharts of FIGS. 27, 28, and 29.

Figure 24:
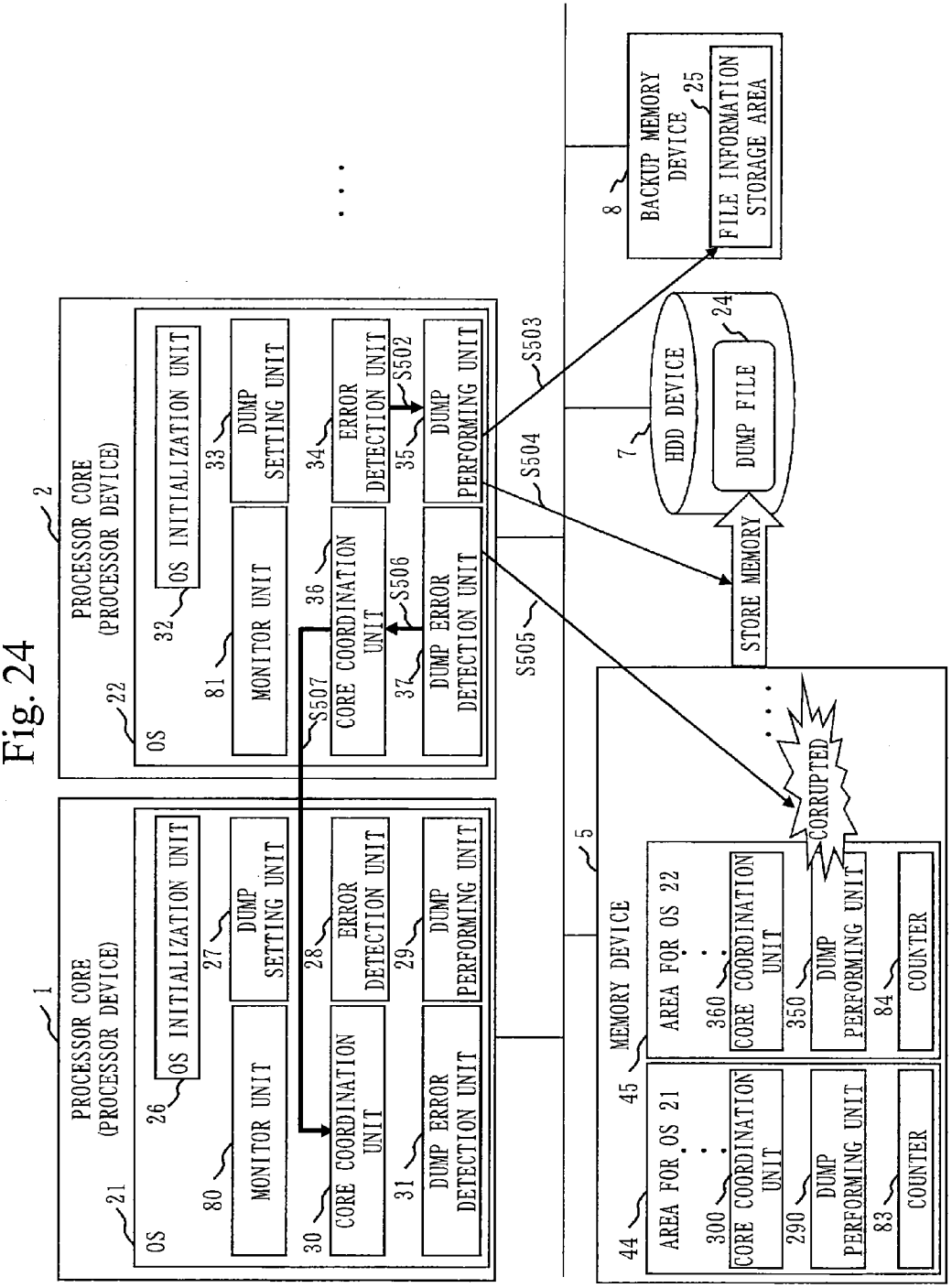
FIG. 24 is a diagram showing example operations upon occurrence of a failure according to the fifth embodiment.
Figure 25:
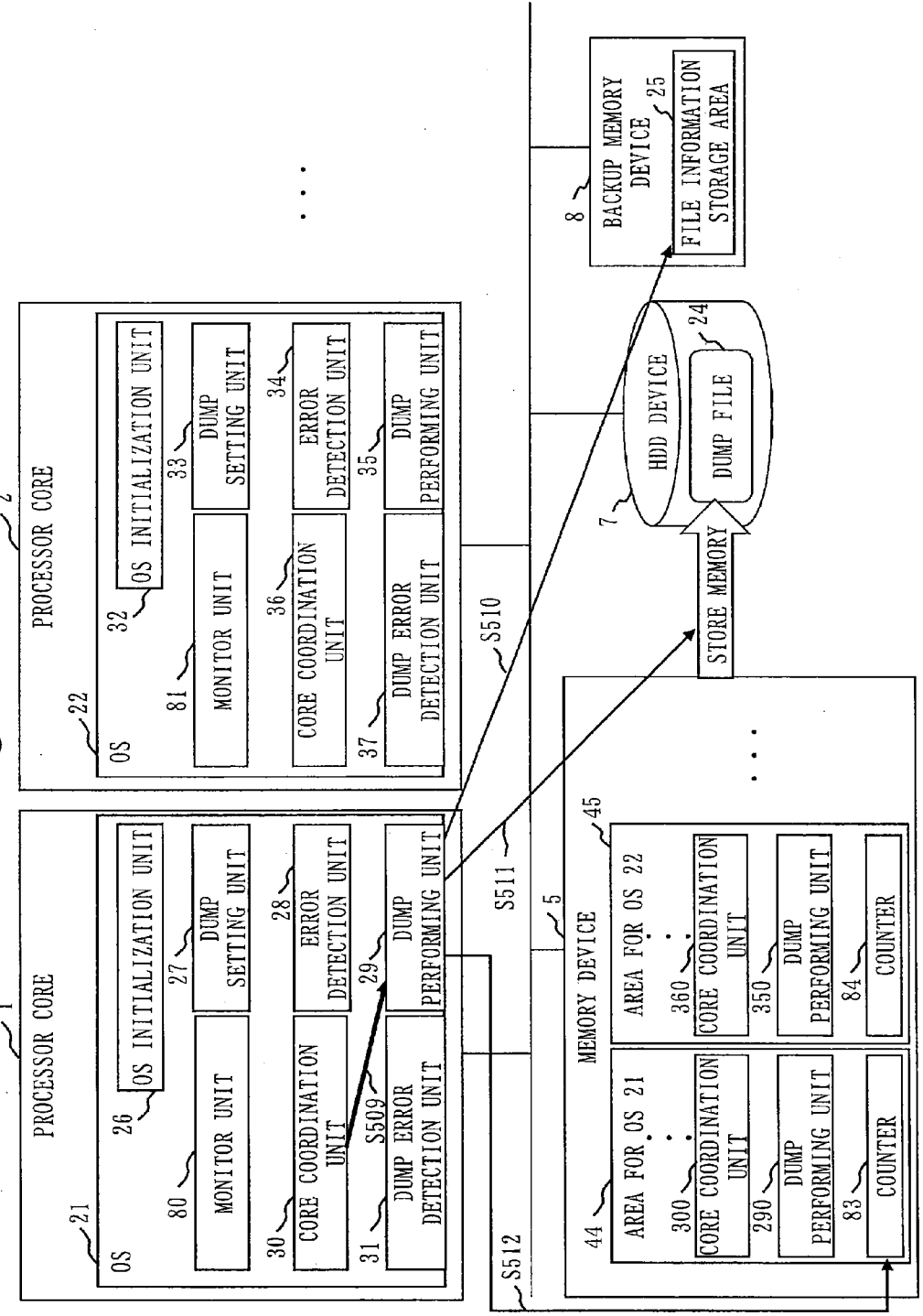
FIG. 25 is a diagram showing example operations upon occurrence of a failure according to the fifth embodiment.
Figure 26:
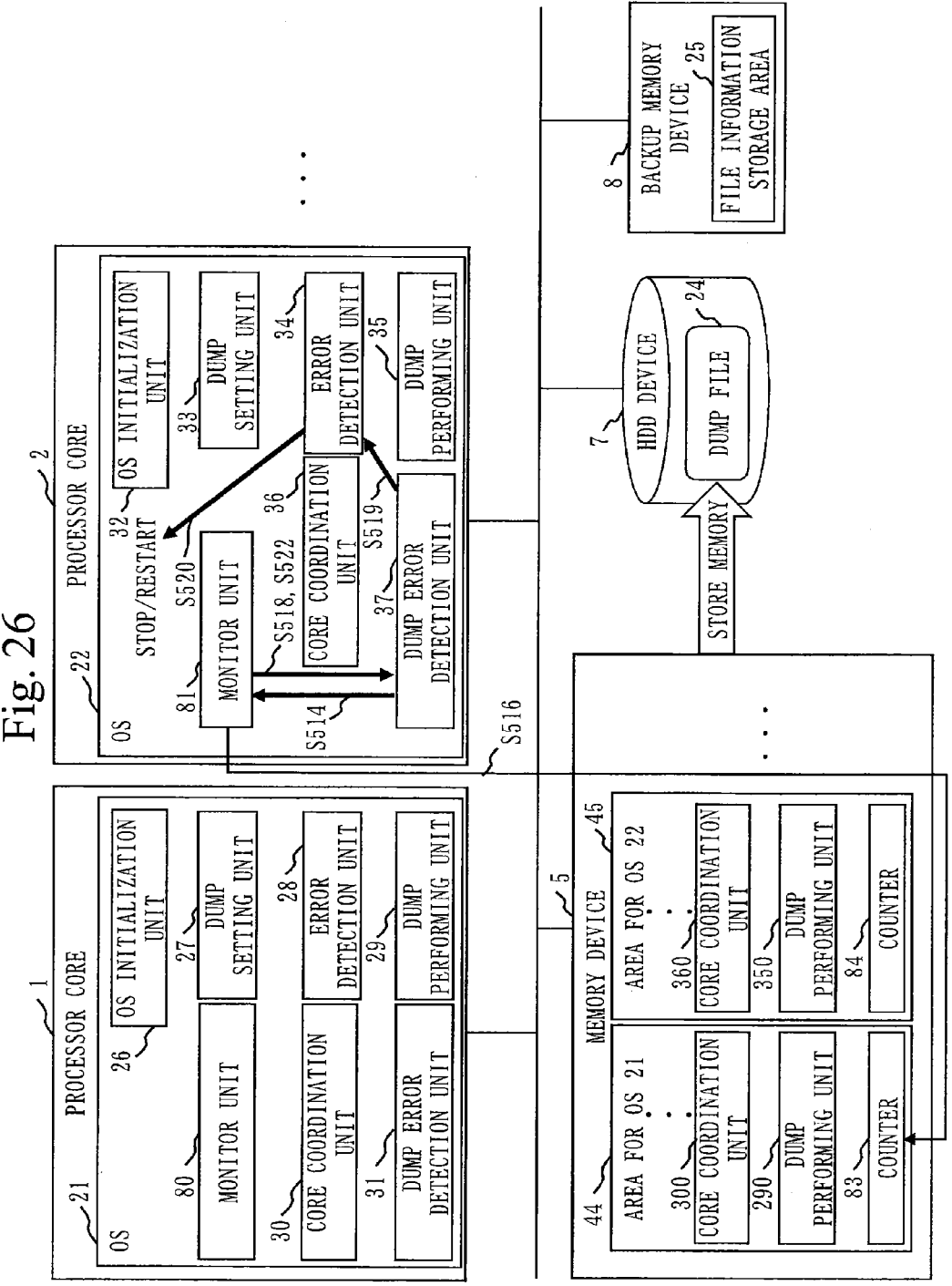
FIG. 26 is a diagram showing example operations upon occurrence of a failure according to the fifth embodiment.

In FIGS. 24, 25, and 26, the processor core 3, the area 46 for the OS 23 in the memory device 5, and the console device 6 are omitted from being shown for convenience of illustration.

Referring to FIGS. 24 to 29, an example will be described in which a failure occurs in the OS 22 operating on the processor core 2 and data of the memory dump performing unit 350 in the area 45 for the OS 22 in the memory device 5, which is code data of the memory dump performing unit 35 of the OS 22 in the memory device 5, has been corrupted.

Figure 27:
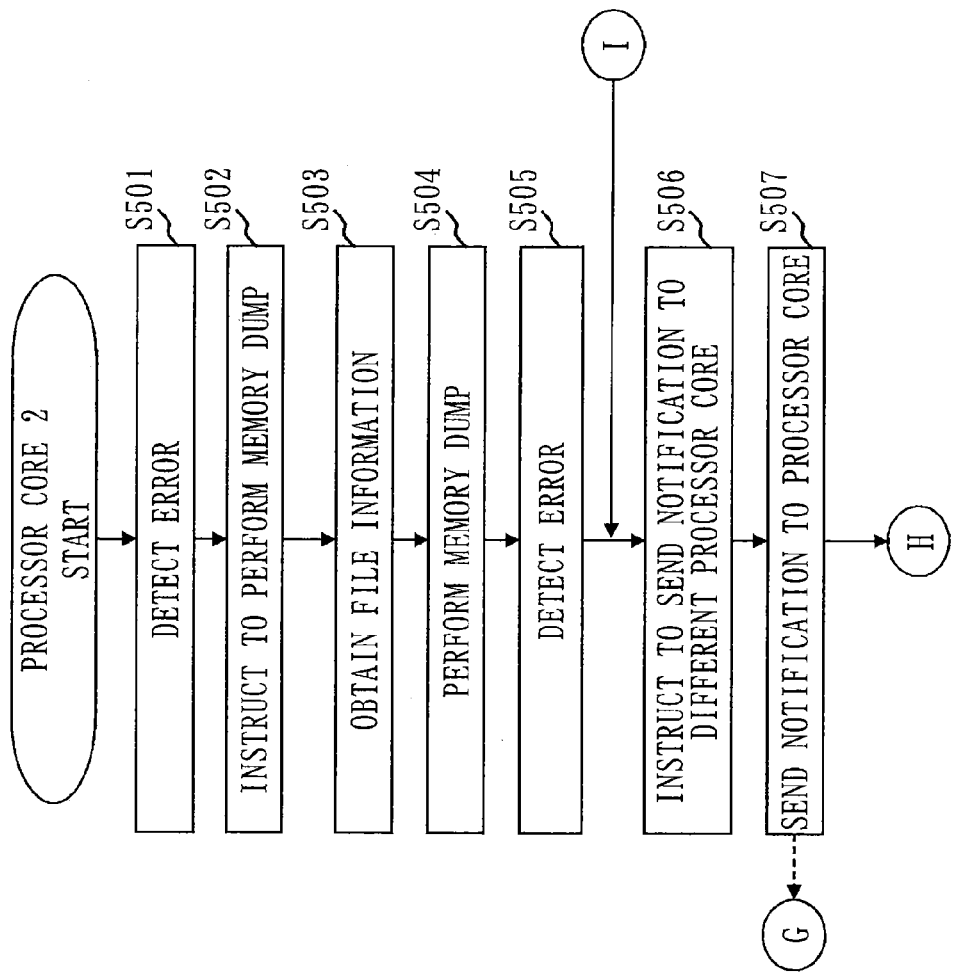
FIG. 27 is a flowchart diagram showing example operations upon occurrence of a failure according to the fifth embodiment.

First, when a failure occurs during operation of the OS 22, the error detection unit 34 of the OS 22 detects this error (S501 of FIG. 27).

After performing a process to identify a cause of the error and so on, the error detection unit 34 sends a memory dump instruction to the memory dump performing unit 35 (S502 of FIGS. 24 and 27).

Upon receiving the memory dump instruction, the memory dump performing unit 35 configures the processor core 2 such that an exception occurring in the processor core 2 in performing a memory dump will be detected by the memory dump error detection unit 37 to prevent the error detection unit 34 from detecting the exception again (since this detection will generate a memory dump instruction again). Then, the memory dump performing unit 35 obtains from the file information storage area 25 in the backup memory device 8 the position information of the dump file 24 in the HDD device 7 (S503 of FIGS. 24 and 27).

Then, based on the obtained position information, the memory dump performing unit 35 writes the contents of the memory device 5 to the dump file 24 in the HDD device 7 (S504 of FIGS. 24 and 27).

If the data of the memory dump performing unit 350 in the area 45 for the OS 22 in the memory device 5 has not been corrupted, the operation of the memory dump performing unit 35 is not hindered, so that the memory dump performing unit 35 completes processing the memory dump properly.

However, if the data of the memory dump performing unit 350 in the area 45 for the OS 22 in the memory device 5 has been corrupted, the operation of the memory dump performing unit 35 becomes undefined, causing an exception on the processor core 2 due to an invalid instruction execution or an invalid access.

The exception that has occurred on the processor core 2 is detected by the memory dump error detection unit 37 (S505 of FIGS. 24 and 27).

Upon detecting the error, the memory dump error detection unit 37 instructs the core coordination unit 36 to send a notification (a notification including a memory dump request) to a different processor core (S506 of FIGS. 24 and 27).

Upon being instructed by the memory dump error detection unit 37, the core coordination unit 36 selects a processor core to send the notification to.

In this embodiment, the notification is sent to the processor core 1 (S507 of FIGS. 24 and 27).

The core coordination unit 36 of the processor core 2 selects the processor core 1 and sends the notification to the processor core 1.

Figure 29:
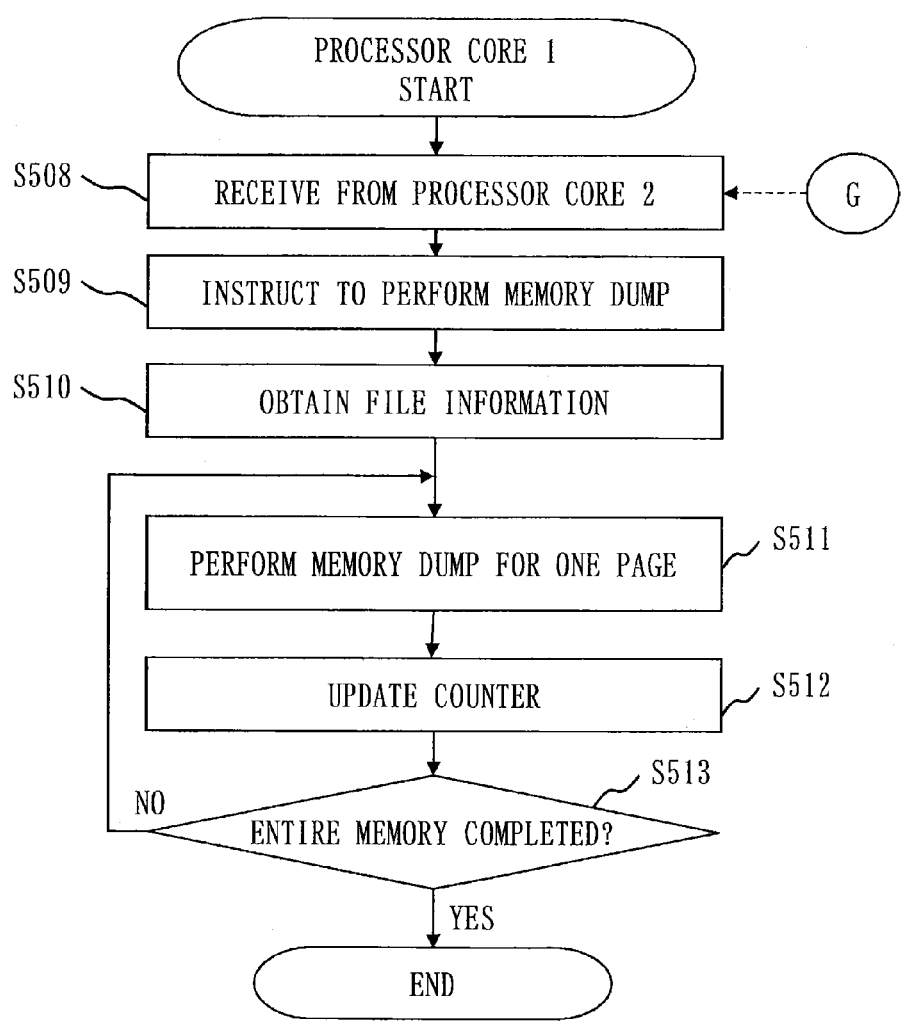
FIG. 29 is a flowchart diagram showing example operations upon occurrence of a failure according to the fifth embodiment.

This notification is received by the core coordination unit 30 of the processor core 1 (S508 of FIG. 29).

Figure 28:
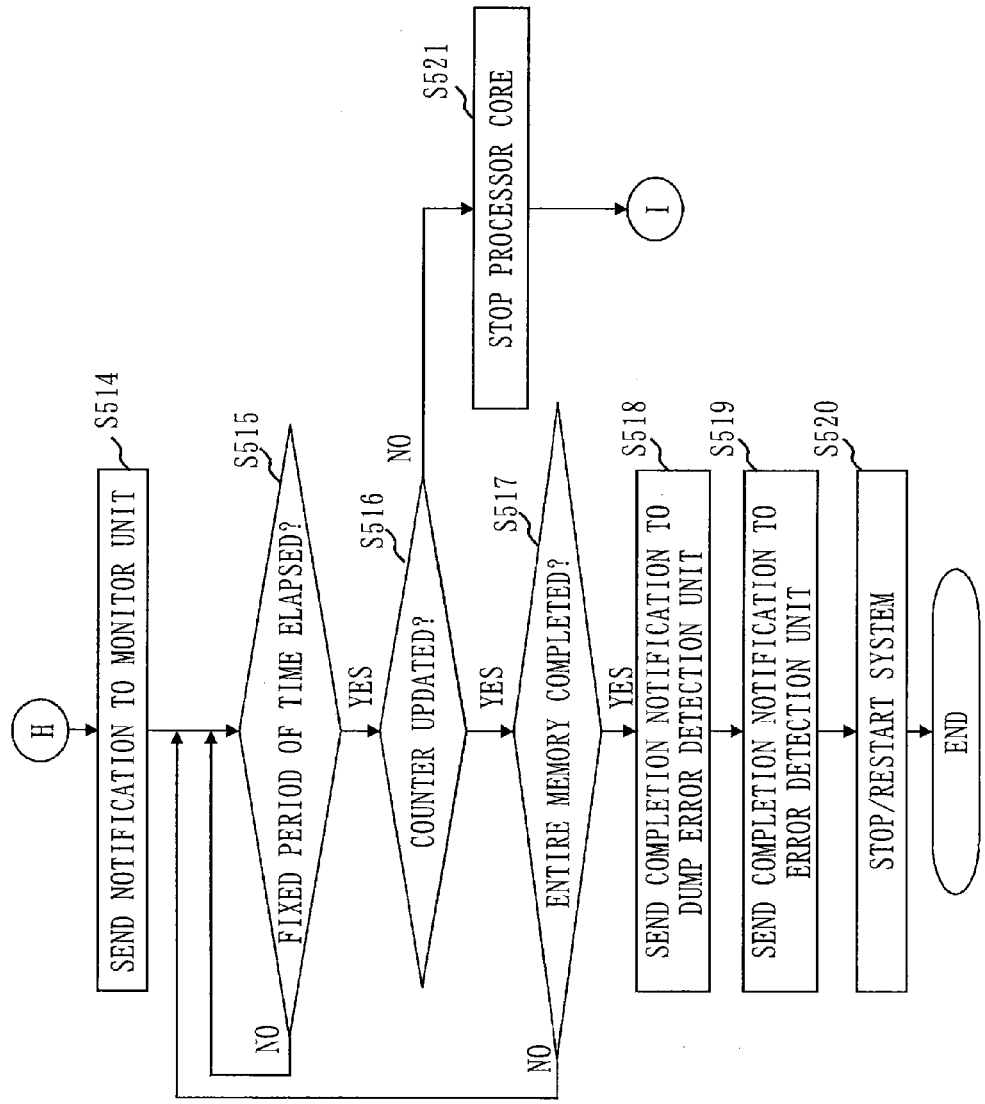
FIG. 28 is a flowchart diagram showing example operations upon occurrence of a failure according to the fifth embodiment.

Upon receiving the notification from the core coordination unit 36 of the processor core 2, the core coordination unit 30 of the processor core 1 instructs the memory dump performing unit 29 to perform the memory dump (S509 of FIGS. 25 and 28).

The memory dump performing unit 29 obtains from the file information storage area 25 in the backup memory device 8 the position information of the dump file 24 in the HDD device 7 (S510 of FIGS. 25 and 28). Based on the obtained position information, the memory dump performing unit 29 writes the contents of the memory device 5 to the dump file 24 in the HDD device 7.

This process is performed as described below.

First, the memory dump performing unit 29 stores the first page (4 Kbytes) of the memory device 5 in the dump file 24 (S511 of FIGS. 25 and 28).

Then, the memory dump performing unit 29 increments by one the counter 83 in the area 44 for the OS 21 in the memory device 5 (S512 of FIGS. 25 and 28).

Next, the memory dump performing unit 29 checks to see if the memory dump has been completed for the entire area of the memory device 5 (S513 of FIG. 29).

If the memory dump has not been completed for the entire area (NO in S513 of FIG. 29), the memory dump is performed for the next page of the memory device 5 (S511 of FIGS. 25 and 28), and the counter 83 is incremented by one again (S512 of FIGS. 25 and 28).

This is performed for the entirety of the memory device 5.

If the memory dump has been completed for the entire area of the memory device 5 (YES in S503 of FIG. 29), the processor core 1 completes the process.

Although the data of the memory dump performing unit 350 in the area 45 for the OS 22 in the memory device 5 has been corrupted, this does not hinder the operation of the memory dump performing unit 290 in the area 44 for the OS 21 in the memory device 5, so that the memory dump performing unit 29 completes the memory dump properly.

In S507, when the core coordination unit 36 of the processor core 2 sends the notification to the processor core 1, the memory dump error detection unit 37 of the processor core 2 sends a monitor start notification to the monitor unit 81 (S514 of FIGS. 26 and 28).

Upon receiving the notification, the monitor unit 81 checks to see if a fixed period of time has elapsed (S515 of FIG. 28).

If the fixed period of time has not elapsed (NO in S515), the monitor unit 81 waits until the time elapses.

If it is determined in S515 that the fixed period of time has elapsed (YES in S515), the monitor unit 81 references the counter 83 in the area 44 for the OS 21 in the memory device 5, and checks to see if the value has been updated (S516 of FIGS. 26 and 28). The counter 83 is updated by the memory dump performing unit 29 of the processor core 1 in S512.

The counter 83 is configured such that the value thereof is incremented by one each time a memory dump of one page is performed. Thus, if the operation of the memory dump performing unit 29 is not hindered, the value has been updated each time the monitor unit 81 references the counter.

If the value has been updated (YES in S516), the monitor unit 81 checks to see if the memory dump has been completed based on the value of the counter 83 (S517 of FIG. 28).

The memory dump performing unit 29 of the processor core 1 increments the counter 83 by one for each page (4 Kbytes). Accordingly, the counter value when the memory dump has been performed for the entirety of the memory device 5 can be calculated by the value of the counter 83=memory size÷4 Kbytes.

When the counter 83 reaches this value, it can be determined that the memory dump has been completed for the entirety of the memory device 5.

If the memory dump has not been completed for the entirety of the memory device 5 (NO in S517), processing returns to S515. After a wait of the fixed period of time again (S515), it is checked if the value of the counter 83 has been updated (S516).

When in S517 the value of the counter 83 has reached the value indicating that the memory dump has been performed for the entirety of the memory device 5, the monitor unit 81 sends a processing completion notification to the memory dump error detection unit 37 (S518 of FIGS. 26 and 28).

Upon receiving the notification, the memory dump error detection unit 37 sends a processing completion notification to the error detection unit 34 (S519 of FIGS. 26 and 28).

Upon receiving the notification, because the memory contents have been stored, the error detection unit 34 stops or restarts the device (S520 of FIGS. 26 and 28).

If the value of the counter 83 has not been updated in S516 (NO in S516), the monitor unit 81 sends a notification to the memory dump error detection unit 37 indicating that an error has occurred in the memory dump process (S522 of FIG. 26).

After recording the error by storing error information in the backup memory device 8 or the like, the memory dump error detection unit 37 stops the processor core 1 (S521 of FIG. 28).

This is achieved by sending a notification through a route using the core coordination unit 36, the route being different from a regular inter-processor core communication route, so that the processor core 1 can determine arrival of a stop instruction.

In this way, the memory dump error detection unit 37 determines that the processor core 1 has failed to perform the memory dump properly, and returns to S506 to send a memory dump instruction to yet another different processor core (the processor core 3) through the core coordination unit 36.

In this way, the memory dump is performed in the memory dump performing unit 41 of the processor core 3. The above has described the operations of the memory dump method in this embodiment upon occurrence of a failure.

In the memory dump method according to the fifth embodiment, each processor core is provided with the monitor unit that monitors a memory dump process of another processor core. Each processor core is also provided with a counter that indicates, during a memory dump process in each processor core, that the memory dump process is being performed properly. The monitor unit references this counter at fixed intervals. If the value has not been updated, the monitor unit determines an error, and requests yet another processor core to perform the memory dump.

Therefore, the memory dump method can be obtained by which a memory dump can be performed reliably even in a situation where an error occurs in a memory dump process in a given processor core and then another processor core performing a memory dump also hangs up during a memory dump process.

In this embodiment, the memory dump including the following composing elements in each processor core has been described.

(1) The OS on each processor core has the following composing elements:
  (a) a counter residing in the memory;
  (b) a means of updating the counter at fixed intervals during a memory dump; and
  (c) a means of checking a counter value after an error occurred in storing into the secondary storage device and a memory dump notification was sent to another processor core, and sending a memory dump notification to yet another processor core if the counter value is not updated within a fixed period of time.

LIST OF REFERENCE SIGNS

1: processor core, 2: processor core, 3: processor core, 4: bus, 5: memory device, 6: console device, 7: HDD device, 8: backup memory device, 9: arithmetic processing unit, 10: arithmetic processing unit, 11: arithmetic processing unit, 12: cache, 13: cache, 14: cache, 15: inter-processor core communication function, 16: inter-processor core communication function, 17: inter-processor core communication function, 18: MMU, 19: MMU, 20: MMU, 21: OS, 22: OS, 23: OS, 24: dump file, 25: file information storage area, 26: OS initialization unit, 27: memory dump setting unit, 28: error detection unit, 29: memory dump performing unit, 30: core coordination unit, 31: memory dump error detection unit, 32: OS initialization unit, 33: memory dump setting unit, 34: error detection unit, 35: memory dump performing unit, 36: core coordination unit, 37: memory dump error detection unit, 44: area for the OS 21, 45: area for the OS 22, 46: area for the OS 23, 50: mapping unit, 51: mapping unit, 54: page table, 55: page table, 56: page table, 60: monitor unit, 61: response unit, 63: counter, 64: counter, 70: map area, 71: map area, 72: map area, 80: monitor unit, 81 monitor unit, 83: counter, 84: counter, 85: counter, 290: memory dump performing unit, 300: core coordination unit, 350: memory dump performing unit, 360: core coordination unit, 410: memory dump performing unit, 420: core coordination unit

The invention claimed is:

1. A processor device connected with another processor device, the another processor device performing a memory dump of a memory device that is shared between the processor device and the another processor device, the processor device comprising:
    a failure detection unit that detects that the memory dump is not being performed properly in the another processor device; and
    a memory dump performing unit that, when the failure detection unit detects that the memory dump is not being performed properly in the another processor device, performs the memory dump of the memory device in place of the another processor device.

2. The processor device according to claim 1, wherein the failure detection unit receives from the another processor device a notification that the memory dump is not being performed properly, and detects that the memory dump is not being performed properly in the another processor device.

3. The processor device according to claim 1, further comprising:
    a monitor unit that monitors a counter value that is updated at predetermined intervals by the another processor device while the another processor device is operating properly, and when the counter value ceases to be updated, determines that the another processor device is not operating properly and instructs the memory dump performing unit to perform the memory dump of the memory device,
    wherein the memory dump performing unit performs the memory dump of the memory device based on an instruction from the monitor unit.

4. The processor device according to claim 1, further comprising:
    a memory dump completion notification unit that, when the memory dump is completed properly by the memory dump performing unit, notifies the another processor device that the memory dump has been completed properly by the memory dump performing unit.

5. The processor device according to claim 1, wherein the processor device is connected with the another processor device that is connected with an MMU (Memory Management Unit) that translates a logical address into a physical address of the memory device, the another processor device being allocated logical addresses corresponding to a subset of physical addresses in the memory device, and other than during the memory dump, being able to access by using the MMU only the subset of physical addresses corresponding to the logical addresses allocated.

6. The processor device according to claim 1, wherein the processor device is connected with an MMU (Memory Management Unit) that translates a logical address into a physical address of the memory device, and is allocated logical addresses corresponding to all physical addresses in the memory device; and
    the memory dump performing unit accesses all the physical addresses in the memory device by using the MMU and performs the memory dump.

7. The processor device according to claim 1,
    wherein the processor device is connected with an MMU (Memory Management Unit) that translates a logical address into a physical address of the memory device, the processor device being allocated logical addresses corresponding to a subset of physical addresses in the memory device, and other than during the memory dump, being able to access by using the MMU only the subset of physical addresses corresponding to the logical addresses allocated,
    the processor device further comprising:
    an access control unit that, at a time of the memory dump, sets logical addresses corresponding to all physical addresses in the memory device to enable the memory dump performing unit to access all the physical addresses in the memory device,
    wherein the memory dump performing unit accesses all the physical addresses in the memory device by using the MMU and performs the memory dump.

8. The processor device according to claim 1,
    wherein the processor device is connected with two or more other processor devices performing the memory dump of the memory device, each of the other processor devices sharing the memory device with one another,
    the processor device further comprising:
    a memory dump request unit that monitors a state of the memory dump being performed by the memory dump performing unit, and when it is detected that the memory dump is not being performed properly in the memory dump performing unit, requests another processor device to perform the memory dump of the memory device in place of the memory dump performing unit, the another processor device being other than the processor device in which it is detected by the failure detection unit that the memory dump is not being performed properly.

9. The processor device according to claim 1,
    wherein the processor device is connected with two or more other processor devices performing the memory dump of the memory device, each of the other processor devices sharing the memory device with one another;
    the processor device further comprising:
    a counter value updating unit that, while the memory dump is being performed properly by the memory dump performing unit, updates at predetermined intervals a counter value of which an update state is monitored by at least one of the other processor devices.

10. A processor device connected with another processor device and sharing a memory device with the another processor device, the processor device comprising:
    a memory dump performing unit that performs a memory dump of the memory device in a predetermined case; and
    a memory dump request unit that monitors a state of the memory dump by the memory dump performing unit, and when it is detected that the memory dump is not being performed properly in the memory dump performing unit, requests the another processor device to perform the memory dump of the memory device in place of the memory dump performing unit.

11. The processor device according to claim 10, further comprising:
a counter value updating unit that updates at predetermined intervals a counter value of which an update state is monitored by the another processor device.

12. The processor device according to claim 10, further comprising:
a monitor unit that, after the memory dump request unit requests the another processor device to perform the memory dump, monitors a counter value that is updated at predetermined intervals by the another processor device while the memory dump is being performed properly in the another processor device, and when the counter value ceases to be updated, determines that the memory dump is not being performed properly in the another processor device.

13. The processor device according to claim 12, wherein
the processor device is connected with two or more other processor devices performing the memory dump of the memory device, each of the other processor devices sharing the memory device with one another; and
the memory dump request unit, when the monitor unit determines that the memory dump is not being performed properly in the processor device requested to perform the memory dump, requests another processor device to perform the memory dump of the memory device, the another processor device being other than the processor device in which it is determined by the monitor unit that the memory dump is not being performed properly.

14. The processor device according to claim 10,
wherein the processor device is connected with an MMU (Memory Management Unit) that translates a logical address into a physical address of the memory device, the processor device being allocated logical addresses corresponding to a subset of physical addresses in the memory device, and other than during the memory dump, being able to access by using the MMU only the subset of physical addresses corresponding to the logical addresses allocated,
the processor device further comprising:
an access control unit that sets, at a time of the memory dump, logical addresses corresponding to all physical addresses in the memory device to enable the memory dump performing unit to access all the physical addresses in the memory device,
wherein the memory dump performing unit accesses all the physical addresses in the memory device by using the MMU and performs the memory dump.

15. A non-transitory computer readable medium including computer executable instructions for a processor device connected with another processor device, the another processor device performing a memory dump of a memory device shared between the processor device and the another processor device, the program computer executable instructions making the processor device execute:
a failure detection process of detecting that the memory dump is not being performed properly in the another processor device; and
a memory dump performing process of performing the memory dump of the memory device in place of the another processor device when the failure detection process detects that the memory dump is not being performed properly in the another processor device.

16. A non-transitory computer readable medium including computer executable instructions for a processor device connected with another processor device and sharing a memory device with the another processor device, the computer executable instructions making the processor device execute:
a memory dump performing process of performing a memory dump of the memory device in a predetermined case; and
a memory dump request process of monitoring a state of the memory dump by the memory dump performing process, and when it is detected that the memory dump is not being performed properly in the memory dump performing process, requesting the another processor device to perform the memory dump of the memory device in place of the memory dump performing process.

* * * * *